United States Patent
Takagi et al.

(10) Patent No.: US 8,133,632 B2
(45) Date of Patent: Mar. 13, 2012

(54) METAL COMPONENT FOR FUEL CELL AND METHOD OF MANUFACTURING THE SAME, AUSTENITIC STAINLESS STEEL FOR POLYMER ELECTROLYTE FUEL CELL AND METAL COMPONENT FOR FUEL CELL USING THE SAME, POLYMER ELECTROLYTE FUEL CELL MATERIAL AND METHOD OF MANUFACTURING THE SAME, CORROSION-RESISTANT CONDUCTIVE COMPONENT AND METHOD OF MANUFACTURING THE SAME, AND FUEL CELL

(75) Inventors: Shinobu Takagi, Nagoya (JP); Masaki Shinkawa, Nagoya (JP); Mikio Ura, Nagoya (JP); Shinichi Yagi, Nagoya (JP); Yasushi Kaneta, Nagoya (JP); Tatsuo Hisada, Nagoya (JP)

(73) Assignee: Daido Tokushuko Kabushiki Kaisha, Nagoya-Shi (JP)

( * ) Notice: Subject to any disclaimer, the term of this patent is extended or adjusted under 35 U.S.C. 154(b) by 0 days.

(21) Appl. No.: 12/573,756

(22) Filed: Oct. 5, 2009

(65) Prior Publication Data
US 2010/0035115 A1 Feb. 11, 2010

Related U.S. Application Data

(62) Division of application No. 10/525,234, filed as application No. PCT/JP03/10428 on Aug. 19, 2003, now Pat. No. 7,597,987.

(30) Foreign Application Priority Data

Aug. 20, 2002 (JP) ................... 2002-239723
Sep. 3, 2002 (JP) ................... 2002-257259
Oct. 28, 2002 (JP) ................... 2002-312226
Dec. 27, 2002 (JP) ................... 2002-380581

(51) Int. Cl.
*H01M 8/02* (2006.01)
*B32B 15/01* (2006.01)
(52) U.S. Cl. ................ 429/468; 429/522; 428/672
(58) Field of Classification Search ............ 429/468, 429/519, 522; 420/49, 60, 61; 156/60; 428/670, 428/672, 673, 680
See application file for complete search history.

(56) References Cited

U.S. PATENT DOCUMENTS
5,614,149 A * 3/1997 Abe et al. ............... 420/49 X
(Continued)

FOREIGN PATENT DOCUMENTS
CA 2 373 344 A1 8/2002
(Continued)

OTHER PUBLICATIONS

"Electroplated coatings of silver for engineering purposes" JIS H8621: 1998.

*Primary Examiner* — Stephen J. Kalafut
(74) *Attorney, Agent, or Firm* — Sughrue Mion, PLLC

(57) ABSTRACT

An Au plated film 12 is formed on the surface of a plate-formed metal base 13 composed of a metal less noble than Au, and the product is cut along a planned cutting line 18 reflecting a contour of a desired component, to thereby form a separator 10. Thus-formed separator 10 has the Au plated film 12 formed on the main surface 10*a* thereof, and has a cutting plane 16 formed as an end face 16 stretched up to the main surface 10*a*. The metal base 13 exposes in a part of the cutting plane 16, in a width of the exposed region of 1 mm or less. This is successful in providing a metal component for fuel cell which is satisfactory in the corrosion resistance and allows easy fabrication at low costs, a method of manufacturing the same, and also in providing a fuel cell having thus-fabricated metal component for fuel cell.

10 Claims, 12 Drawing Sheets

U.S. PATENT DOCUMENTS

| | | | | |
|---|---|---|---|---|
| 5,846,668 A | * | 12/1998 | Watanabe | 429/468 X |
| 6,063,211 A | * | 5/2000 | Soeda et al. | 420/417 X |
| 6,251,253 B1 | | 6/2001 | Gillman et al. | |
| 6,274,258 B1 | * | 8/2001 | Chen | 429/468 X |
| 6,348,279 B1 | | 2/2002 | Saito et al. | |
| 6,379,476 B1 | | 4/2002 | Tarutani et al. | |
| 6,410,178 B1 | | 6/2002 | Matsukawa | |
| 6,440,579 B1 | * | 8/2002 | Hauser et al. | 420/49 X |
| 6,485,680 B2 | * | 11/2002 | Ragot et al. | 420/49 X |
| 6,780,258 B2 | * | 8/2004 | Katsuki et al. | 420/49 X |

FOREIGN PATENT DOCUMENTS

| | | |
|---|---|---|
| DE | 198 05 674 C1 | 9/1999 |
| EP | 0 949 704 A1 | 10/1999 |
| EP | 0949704 AL | 10/1999 |
| EP | 1 107 340 A2 | 6/2001 |
| EP | 1137089 A2 | 9/2001 |
| EP | 1 227 531 A1 | 7/2002 |
| EP | 1 237 215 A2 | 9/2002 |
| JP | 57-35669 A | 2/1982 |
| JP | 10-228914 A | 8/1998 |
| JP | 2000-1755 A | 1/2000 |
| JP | 2000-21418 A | 1/2000 |
| JP | 2000-256808 A | 9/2000 |
| JP | 2000-309854 A | 11/2000 |
| JP | 2000-323151 A | 11/2000 |
| JP | 2000-328200 A | 11/2000 |
| JP | 2001-68129 A | 3/2001 |
| JP | 2001-243962 A | 9/2001 |
| JP | 2001-297777 A | 10/2001 |
| JP | 2001-345109 A | 12/2001 |
| JP | 2002-75399 A | 3/2002 |
| JP | 2002-190305 A | 7/2002 |
| JP | 2003-234109 A | 8/2003 |

* cited by examiner

PRIOR ART

METAL COMPONENT FOR FUEL CELL AND METHOD OF MANUFACTURING THE SAME, AUSTENITIC STAINLESS STEEL FOR POLYMER ELECTROLYTE FUEL CELL AND METAL COMPONENT FOR FUEL CELL USING THE SAME, POLYMER ELECTROLYTE FUEL CELL MATERIAL AND METHOD OF MANUFACTURING THE SAME, CORROSION-RESISTANT CONDUCTIVE COMPONENT AND METHOD OF MANUFACTURING THE SAME, AND FUEL CELL

CROSS REFERENCE TO RELATED APPLICATION

This application is a divisional of U.S. application Ser. No. 10/525,234, filed Feb. 22, 2005, now U.S. Pat. No. 7,597,987, which is a National Stage application of PCT/JP2003/010428, filed Aug. 19, 2003, the disclosure of which is incorporated herein by reference.

TECHNICAL FIELD

A first invention relates to a metal component for fuel cell and a method of manufacturing the same, and also to a fuel cell.

A second invention relates to an austenitic stainless steel for polymer electrolyte fuel cell, and more specifically to an austenitic stainless steel for polymer electrolyte fuel cell used for conductive separator, current collector and so forth, and a metal component for fuel cell using the same, and also to a fuel cell.

A third invention relates to a polymer electrolyte fuel cell material such as a metal separator, current collector plate and so forth used in polymer electrolyte fuel cell, and a method of manufacturing the same, and also to a metal component for fuel cell using the same and a fuel cell.

A fourth invention relates to a corrosion-resistant conductive material represented by a metal separator for fuel cell, and a method of manufacturing the same, and also to a fuel cell.

BACKGROUND ART

First Invention

There are known fuel cells which include polymer electrolyte fuel cell, phosphoric-acid fuel cell, molten carbonate fuel cell and solid-oxide fuel cell. Of these, polymer electrolyte fuel cell, which is operable at low temperatures and can readily be reduced in size and weight, is aimed at being mounted on such as fuel cell vehicle, stationary cogeneration system and mobile applications. In the polymer electrolyte fuel cell, the top and back surfaces of a polymer electrolyte film for transferring proton are held by a pair of electrodes on which carbon particles having a platinum catalyst supported thereon are immobilized, and thus-obtained membrane/electrode assembly (MEA) is held between separators having gas diffusion layer (carbon paper) and reaction gas supply grooves formed thereon, thereby a unit cell is formed. In general, a plurality of the unit cells are electrically connected in series so as to form a stack. The separator has surface of regular rough, formed thereon, for supplying reaction gas so as to bring a fuel gas (hydrogen gas) or an oxidizer gas (air) into contact with the electrode, and is configured so as to allow the projected portions formed thereon to contact with the surface of the electrode, and to allow the recessed portions to be supplied with the reaction gas. A conventional separator has been made of carbon, but efforts have been also made on those made of metals, in view of realizing cost reduction, downsizing, and weight reduction of the fuel cell.

Adoption of the metal-made separators such as those made of stainless steel may raise a problem below. That is, a polymer electrolyte film of a polymer electrolyte fuel cell contains sulfonic acid group, and needs moisture in order to exhibit ion conductivity. Contact of the moisture with the separator, however, lowers pH due to the sulfonic acid group, and this allows corrosion of the separator to proceed in a power generation environment of the fuel cell. Corrosion of the separator results in deterioration of the polymer electrolyte film due to eluted metal ion, locally raises the electric resistance, and undesirably lowers the output of the fuel cell due to increase in the internal resistance.

Various efforts have therefore been made in view of prevent corrosion of the separator. For example, Japanese Laid-Open Patent Publication "Tokkai" No. 2001-68129, "Tokkai" No. 2000-021418 and "Tokkaihei" No. 10-228914 disclose separators made of stainless steel having an Au plated film of a predetermined thickness formed on the surface thereof. Of these, the above publication "Tokkai" No. 2001-68129 discloses a separator successfully reduced in influences of pinholes in the Au plated film formed on the surface of the separator, and thereby having an improved corrosion resistance, by closing the pinholes by roller pressing or resin molding. On the other hand, the publication "Tokkaihei" No. 10-228914 discloses a separator having an Au plated film of relatively as thin as 0.01 to 0.06 μm partially formed in an area of the metal base composing the separator, to be brought into direct contact with the electrode, and thereby having a reduced contact resistance with the electrode while keeping a desirable level of corrosion resistance.

The separator disclosed in the publication "Tokkai" No. 2001-68129 is, however, fabricated by first forming an under-plated film prior to the Au plating, the Au plated film is then formed to a relatively large thickness in order to reduce the pinholes possibly formed in the Au plated film, and the obtained Au plated film is further roller-pressed, so that this inevitably increases the number of process steps of the fabrication, and also increases Au consumption. Also the separator disclosed in the publication "Tokkaihei" No. 10-228914 is disadvantageous in terms of simplification of the fabrication process, because the Au plated film is partially formed in the portion to be brought into direct contact with the electrode. Moreover, the separator has no Au plated film in the recessed portions (which serves as a gas flow path) which are not brought into contact with the electrode, and this may result in only a limited corrosion resistance against puddles formed in the portions. Both of the separators for fuel cell disclosed in the publications "Tokkai" No. 2001-68129 and "Tokkaihei" No. 10-228914 are fabricated by cutting a metal base to be processed into the separators, and then subjecting them to the Au plating, but this is not convenient in terms of fabrication process, because the individual separated metal bases must be plated.

Second Invention

Because a metal separator for polymer electrolyte fuel cell allows an electrode of a unit cell and another electrode of the adjacent unit cell to electrically contact with each other, and separates the reaction gas, it is necessary for the separator to have an excellent electric conductivity, an excellent gas tight performance to the reaction gas, and an excellent corrosion resistance against power generation reaction based on a hydrogen/(oxygen or air) redox system.

There are known conventional metal separators for polymer electrolyte fuel cells such as having a large number of regular rough patterned grooves, for allowing the fuel gas or oxidizer gas to pass through, formed thereon by cutting carbon plates such as those composed of graphite or the like. The fabrication according to this method, however, suffers from increase in costs of the carbon materials and cutting process, and this raises difficulty in practical application of the separators in view of costs. Another problem resides in that the carbon plate cannot be thinned due to its poor strength, and therefore cannot be reduced in size.

There have been developed metal separators for polymer electrolyte fuel cells, composed of a readily-machinable stainless steel having a treated surface. The publication "Tokkaihei" No. 10-228914 discloses use of SUS304 as the stainless steel, and the publication "Tokkai" No. 2000-021418 discloses use of SUS316. The publication "Tokkai" No. 2000-256808 discloses a stainless steel for polymer electrolyte fuel cell containing 30% or less of Cr, and if necessary also at least either of Mo: 10% or less and Ni: 25% or less, and satisfies a relation of $10-0.3 \times ([Cr \%]+3\times[Mo \%]+0.05\times[Ni \%]) \leq 5$, and the balance of mainly Fe.

As materials for composing the conductive separators for polymer-electrolyte-type fuel cells, the publication "Tokkai" No. 2001-243962 discloses a ferritic or an austenitic stainless steel having a carbon content not exceeding 0.03%, a ferritic or an austenitic stainless steel having a carbon content of less than 0.03% and a Mo content of 1.5 to 8%, an austenitic stainless steel having a carbon content of 0.03% or less and a nitrogen content of 0.1 to 0.3%, and so forth.

The above-described SUS304 and SUS316 are, however, known to have problems in the corrosion resistance due to their large contents of C, Mn and S. The stainless steel disclosed in the publication "Tokkai" No. 2001-243962 suffers from a poor machinability and a large cost, due to its substantially large Cr content, and also a large Mo content.

The separators for polymer electrolyte fuel cell is exposed to an extremely corrosive environment of sulfuric acid acidity and steam at about 80° C. or more during power generation. An extremely high corrosion resistance is therefore required for the separators. On the other hand, metal separators workable by plastic working into complicated geometry have also been developed for cost reduction, wherein the above-described corrosion resistance is required also for this sort of separators.

Conventional measure for improving corrosion resistance of the separators relates to use of a metal base plate composed of stainless steel or the like for configuring the separator, having the surface of which covered with a cover film of a noble metal such as Au, Pt or the like by plating and vacuum evaporation showing a higher corrosion resistance than that of the metal base.

In the formation of the cover film of a noble metal, the resultant cover film will have a surface of regular rough conforming to a fine surface of regular rough which intrinsically resides on the surface of the metal base plate, but with an emphasized profile. In recessed portions on the surface of such film, or in crystal grain boundary of the metal base plate, the noble metal film is less depositable as compared with the projected portions or other portions, and the film will therefore tend to be thinned. The recessed portions on the surface of the noble metal film and portions in the vicinity of the crystal grain boundary will therefore show only a limited corrosion resistance, and this makes the corrosion more likely to proceed from these portions towards the inner portion of the separator.

Third Invention

The separators for polymer electrolyte fuel cell is exposed to an extremely corrosive environment of sulfuric acid acidity and steam at about 80° C. or more during power generation. An extremely high corrosion resistance is therefore required for the separators. On the other hand, metal separators workable by plastic working into complicated geometry have also been developed for cost reduction, wherein the above-described corrosion resistance is required also for this sort of separators.

Conventional measure for improving corrosion resistance of the separators relates to use of a metal base plate composed of stainless steel or the like for configuring the separator, having the surface of which covered with a cover film of a noble metal such as Au, Pt or the like showing a higher corrosion resistance than that of the base element by plating or vacuum evaporation.

In the formation of the cover film of a noble metal, the resultant cover film will have a surface of regular rough conforming to a fine surface of regular rough which intrinsically resides on the surface of the metal base plate, but with an emphasized profile. In recessed portions on the surface of such film, or in crystal grain boundary of the metal base plate, the noble metal film is less depositable as compared with the projected portions or other portions, and the film will therefore tend to be thinned.

The recessed portions on the surface of the noble metal film and portions in the vicinity of the crystal grain boundary will therefore show only a limited corrosion resistance, and this makes the corrosion more likely to proceed from these portions towards the inner portion of the separator.

Fourth Invention

With respect to the metal separator and current collector for fuel cells, there is proposed a technique of forming a thin Au plated film on the surface of a metal base such as stainless steel, in order to keep a desirable level of corrosion resistance and to lower the contact resistance (Japanese Laid-Open Patent Publication "Tokkaihei" No. 10-228914). This sort of treatment is also effective for various materials for electric contacts and terminals. According to the proposal, it is described that those having a Au plated film of 0.01 to 0.06 μm thick directly formed on the stainless base show no Cr elution even after being subjected to nitric acid aeration test(JIS H8621) for one hour, and that this proves formation of no pinholes.

The metal separators in practical polymer electrolyte fuel cell will be exposed to more severe conditions such as a temperature of as high as 100° C., so that higher corrosion resistance enough to prove no elution of metal ions even under more severe test conditions is required, such as under dipping in a boiling sulfuric acid solution of pH 2 for 168 hours. Increase in the thickness of the plated film may substantially solve the problem, but the metal separators for fuel cell, used in a form of stack comprising a large number thereof, is not practical on the cost basis unless the thickness of the plated film is 100 nm or thinner.

The separators having a Au plated film (0.01 to 0.06 μm thick) formed on the surface of the metal base, in particular of the stainless steel base, by the Au plating process described in the aforementioned Japanese Laid-Open Patent Publication "Tokkaihei" No. 10-228914, which specifically conforms to processes of "degreasing→cleaning→surface activation→cleaning→Au plating→cleaning→drying", however, was found to show elution of elements composing the metal base in the dipping test in a boiling sulfuric acid solution of pH 2 for 168 hours, and the amount of elution thereof was found to considerably vary case by case. It is therefore obvious that a conductive material having an excellent corrosion resistance equivalent to that of the metal separator available for the polymer electrolyte fuel cell cannot be obtained only by subjecting the surface of the metal base to the Au plating according to any publicly-known methods.

Aiming at providing a conductive corrosion-resistant component durable in the above-described severe test, the present inventors made search for reasons for the poor corrosion resistance of the known Au-plated products, and reached the conclusions below:

- the surface of the metal base and noble metal film plated thereon contain a larger amount of impurities than expected, and these impair the corrosion resistance of the film;
- there is an intermediate layer containing the impurities at least partially between the noble metal film and metal base, and this lowers adhesiveness of the film per se to the metal base; and
- the impurities are supposed to be incorporated before foreign films on the surface of the metal base, such as passivation film, oxide film and contamination film, which are harmful to corrosion resistance, are completely removed, and the noble metal film is directly formed thereon.

A conceptual expression of the above conclusions is given as an upper drawing of FIG. 12. This is not a product of a mere imagination, but is experimentally supported by Auger analysis which is given as a lower drawing of FIG. 12.

Residence of any foreign films and intermediate layer may result in the following nonconformities:

- foreign film components produce the pinholes in the noble metal film, which serve as initiation points of corrosion;
- any sites of the intermediate layer having a small electric conductivity may vary current density in electroplating, or locally worsens the uniformity, and this may increase the pinholes and reduce denseness of the film; and
- a poor adhesiveness between the intermediate layer and noble metal film may readily result in separation of the noble metal film triggered by some external impact.

It is therefore an object of the first invention to provide a metal component for fuel cell which is satisfactory in the corrosion resistance and allows easy fabrication at low costs, and a method of manufacturing the same, and is further to provide a fuel cell having thus-manufactured metal component for fuel cell.

An object of the second invention is to provide an austenitic stainless steel for polymer electrolyte fuel cell excellent in resistance against sulfuric acid acidity.

An object of the third invention is to provide a highly-corrosion-resistant, polymer electrolyte fuel cell material such as metal separator, current collector and so forth, and a method of manufacturing a polymer electrolyte fuel cell material capable of manufacturing the same in a reliable manner.

An object of the fourth invention is to provide a corrosion-resistant conductive component, in particular metal separator for fuel cell, comprising a metal base and a noble metal film formed thereon, overcoming the aforementioned problems, being very few in the pinholes, dense in the film quality, excellent in the adhesiveness to the metal base, and therefore being durable against severe conditions of use.

DISCLOSURE OF THE INVENTION

First Invention

A first aspect of the metal component for fuel cell of the first invention relates to a metal component for fuel cell, to be disposed in contact with a main cell unit comprising a polymer electrolyte film and a pair of electrodes holding it in between, which is configured as having a plate-formed metal base composed of a metal less noble than Au, and an Au film formed on the main surface thereof, and having a cutting plane formed as an end face stretched up to the main surface, wherein the cutting plane has a region of 1 mm or less in width having said metal base exposes therein.

A second aspect of the metal component for fuel cell of the first invention relates to metal component for fuel cell, to be disposed in contact with a main cell unit comprising a polymer electrolyte film and a pair of electrodes holding it in between, which is configured as having an Au film formed on the main surface of a plate-formed metal base composed of a metal less noble than Au, and the metal base being cut along a planned cutting line reflecting a contour of the component.

A first invention's method of manufacturing the above-described metal components for fuel cell of the first and second aspects relates to a method of manufacturing a metal component for fuel cell, to be disposed in contact with a main cell unit comprising a polymer electrolyte film and a pair of electrodes holding it in between, comprising the steps of forming an Au film on the surface of a plate-formed metal base composed of a metal less noble than Au, and cutting the metal base along a planned cutting line reflecting a contour of the component.

A possible reason why the conventional formation of the Au film on the metal base to be processed into a separator, in view of improving the corrosion resistance, is carried out after the metal base is shaped into a geometry of a separator, for example, may be as follows. That is, shaping of the metal base having the Au film formed thereon may cause crack in the Au film already formed thereon, or produce a cutting plane by cutting of the metal base, to thereby allow the metal base to expose in these regions, and corrosion is supposed to proceed in thus-exposed metal base. In fact, the aforementioned patent publication discusses that the pinholes formed in the Au plated film are regions where the metal base exposes and the corrosion thereof can proceed, so that this sort of exposure must be undesired.

The present inventors therefore made an experiment as described below. SUS316L was used as a material for composing the metal base, which is processed into the separator, an Au film of 100 nm thick or around was formed on the surface of the metal base before the metal base is shaped into the separator geometry, and the metal base is then dipped into a corrosive solution. The end face of the separator formed a cutting plane, and had some region where the metal base exposes therein. The corrosive solution was a sulfuric acid solution of pH2, had a temperature of 100° C., and dipping time was set to 168 hours. The cutting plane of the metal base after the experiment was observed. No change in color of the metal base was observed even it was exposed in the cutting plane, and therefore no corrosion of the metal base was observed. The result indicates that the exposed region of the metal component disposed in contact with the main unit of fuel cell is not always corroded, even if the surface thereof is exposed to the corrosive environment, provided that the Au film resides in the neighboring region. The present inventors found out, as demonstrated by the above-described experiment, that a metal component for fuel cell having a satisfactory corrosion resistance can be obtained even if the metal base is cut after the Au film is formed thereon, and the fact led us to the first invention. Adoption of this method typically makes it possible to form the Au film en bloc over a region of a relatively wide range, such as over the surface of a band-formed metal base, and thereby makes it possible to simplify a process of formation of the Au film. In thus-manufactured metal component for fuel cell of the first invention, a desirable corrosion resistance can be ensured even if the metal base exposes in the region to be brought into direct contact with the electrode, or the region to be brought into direct contact with a corrosive environment such as a moisture-containing oxidizer gas (air, for example) atmosphere, so that it is no more necessary to roller-press the Au film after formation thereof, or to form the Au film to a relatively large thickness (1 μm or around, for example), in order to suppress formation of the pinholes. This makes it possible to further facilitate the manufacturing, reduces Au consumption, and to realize an inexpensive metal component for fuel cell. It was also found that corrosion of the metal base can sufficiently be suppressed if the width of the surface of the metal base, exposed in the cutting plane of the metal component, is as wide as 1 mm or less. The width of the exposed surface of the metal base exceeding 1 mm makes the exposed region of the metal base in the cutting plane too wide, and is unsuccessful in realizing a sufficient level of corrosion resistance in the cutting plane.

The metal components for fuel cell of the first and second aspects may also be configured as follows. That is, the electrode of fuel cell may have a plate form and is in contact with the solid polymer film on a first main surface thereof, and the metal component may be configured as a separator disposed in contact with the electrode on a second main surface thereof, having a regular rough on the main surface opposing to the electrode, wherein projected portions of the regular rough are brought into contact with the electrode, and recessed portions of the regular rough serves as a gas flow path through which a fuel gas or an oxidizer gas is supplied to the electrode. The separator thus disposed in contact with the electrode of the main unit of the cell may possibly be brought into contact with the fuel gas or oxidizer gas to be supplied to the electrode. Moreover, the separator is a component very likely to be corroded due to sulfate ion which may possibly be eluted from the polymer electrolyte film. It is therefore particularly necessary for the separator to be highly corrosion resistant, and the preferable application range specified in the first aspect of the first invention makes sense.

A third aspect of the metal component for fuel cell of the first invention relates to metal component for fuel cell, available as a separator disposed in contact with a second main surface of a plate-formed electrode which is disposed in contact with a polymer electrolyte film on a first main surface thereof, and has a regular rough on the main surface, opposing to the electrode, of a plate-formed metal base composed of a metal less noble than Au, top portions of projected portions of the regular rough are brought into contact with the electrode, and recessed portions of the regular rough serve as a gas flow path through which a fuel gas or an oxidizer gas is supplied to the electrode, wherein the metal base has an Au film of 1 to 500 nm thick formed on both of the tip surface of the projected portions brought into contact with the electrode, and the main surface region other than the tip surface.

Corrosion of the metal base will not proceed, as described in the above, even if the metal base exposes in the region susceptible to the corrosion, such as in the region in direct contact with the electrode, but the region susceptible to the corrosion having absolutely no Au film is unsuccessful in sufficiently preventing the metal base from being corroded. Therefore, the separator for fuel cell, such as being disclosed in Japanese Laid-Open Patent Publication "Tokkaihei" No. 10-228914, disposed in contact with the electrode, and having a regular rough formed on the main surface on the side brought into contact with the electrode, may be corroded in the recessed portions thereof which is not brought into contact with the electrode and serve as a gas flow path through which the fuel gas or oxidizer gas are supplied to the electrode, unless the recessed portions has the Au film formed thereon. The metal component for fuel cell according to the third aspect of the first invention is therefore designed to have the Au film which covers also the region not brought into contact with the electrode, to thereby suppress the corrosion in such region. It is not always necessary for the region not brought into contact with the electrode to be completely covered with the Au film, wherein the exposed portions of the metal base, such as pinholes, crack and so forth may remain. This allows the thickness of the Au film to be set to as relatively small as 500 nm or less, which tends to produce pinholes. The thickness of 1 nm or less is, however, not successful in satisfactorily preventing the corrosion of the metal base due to an extremely small amount of formation of the Au film. On the other hand, the thickness exceeding 500 nm increases Au consumption and takes a longer time for the fabrication, and this departs from the object of the first invention.

In thus-configured aforementioned metal component for fuel cell, a reason why the metal base exposed in the region to be brought into exposed to a corrosive environment, in which the corrosion should proceed in general, is not corroded is supposed as follows. Considering now arrangement of the individual components of the fuel cell, in which the Au film is formed and the metal base exposes in the region characterized by a corrosive environment of the fuel cell, the metal base and the Au film can configure a local cell. The local cell shifts the electrode potential of the metal base in the corrosive environment towards the passivity where the surface of the metal base is passivated, and thereby the corrosion of the surface of the metal base is suppressed.

Further detail will be given referring to FIG. 7A and FIG. 7B. FIG. 7A schematically shows a potential-pH chart of a certain specific metal base. For an exemplary case where the corrosive environment in which the metal component for fuel cell of the first invention is arranged has a pH value of 1, and where only the metal base resides in the corrosive environment, it is assumed now that the electrode potential E (V) in reference to a hydrogen standard electrode has a value of E1 (V). Because electrode potential E1 under pH1 falls in the corrosion, the metal base in this situation will be corroded. Formation of the Au film on the surface of the metal base, while leaving the metal base partially exposed in the corrosive environment, results in formation of a local cell in which the metal base functions as an anode, and the Au film functions as a cathode. FIG. 7B shows an anode polarization curve "ia" and a cathode polarization curve "ic". The Au film herein acts as a catalyst for promoting the cathode reaction at the cathode electrode. Increase in cathode reaction current shifts the cathode polarization curve "ic" towards the large current side, and raises the electrode potential of the anode up to E2. If the electrode potential E2 falls in the passivity as shown in FIG. 7A, corrosion of the metal base is successfully suppressed even when the metal base is exposed to an environment of pH1.

The metal base successfully suppressed in the corrosion based on the above-described mechanism may be composed of a material capable of forming at least the active potential region and passive potential region in the anode polarization curve measured in an sulfuric acid solution of pH1 at 80° C., and of showing an anode current in the passivity of 100 μA/cm$^2$ or less. In other words, it is made possible, even in a corrosive environment, to raise potential of the metal base through formation of the local cell with the Au film as described in the above and to bring the potential into the passivity, if there is at least a potential range possibly shows passivity in the pH1 environment.

On the other hand, it is preferable to use the metal base such as showing the active potential region in the anode polarization curve under the pH1 condition. Absence of the active potential region under the pH1 environment essentially indicates that the metal cannot be corroded in the environment. This sort of metal is generally expensive, so that it is undesirable to form the Au film on the metal base composed of such expensive metal, in view of suppressing increase in the cost.

An anode current density of 100 μA/cm$^2$ or less in the passive potential range makes it possible to suppress the corrosion rate to a sufficiently low level, and to ensure a satisfactory level of corrosion resistance.

Suppression of the corrosion of the metal base is ascribable to formation of the local cell, based on contact between the Au film and metal base in the corrosive environment. It is therefore also allowable to adopt a configuration in which the Au film is preliminarily formed on the surface of a component which is possibly brought into contact with the surface of the metal base of the metal component for fuel cell after being incorporated into the fuel cell, so as to allow the metal base and Au film to contact with each other when the both are assembled to configure the fuel cell. For the metal component for fuel cell used herein, it is necessary to adopt the metal base capable of forming the passive potential region as described in the above, having no Au film formed on the surface thereof.

It is still also possible to configure a fuel cell of the first invention, by using the above-described metal component for fuel cell of the first invention. That is, the fuel cell of the first invention has a main cell unit which comprises a solid polymer film as an electrolyte and a pair of electrodes holding it in between, and the metal component for fuel cell of the first invention. This sort of fuel cell is successful in suppressing the corrosion of the metal component for fuel cell used therefor, has a satisfactory lifetime, and is less likely to cause lowering in the obtainable output power. The fuel cell is also advantageous in that it can be configured with less expensive components, and consequently at low costs.

The metal component for fuel cell of the first invention may be such as being disposed in a sulfuric acid acidic environment of pH1 to 6 during operation of the fuel cell. Some cases use a sulfonic-acid-group-containing film as the polymer electrolyte film. The polymer electrolyte film is used in a moist condition, and may therefore elute sulfate ion. The metal component disposed in the vicinity of the polymer electrolyte film may therefore be exposed to the sulfuric acid atmosphere, so that the metal component for fuel cell can be said as having a satisfactory level of corrosion resistance, only when it succeeds in suppressing the corrosion of the metal component in the sulfuric acid atmosphere of pH1 to 6.

Second Invention

The present inventors investigated particularly into austenitic stainless steel for polymer electrolyte fuel cell excellent in sulfuric acid resistance, and found out that the sulfuric acid atmosphere in the vicinity of the electrode is created by water which is saturated under moistening, in the polymer electrolyte film, which is used for the polymer electrolyte fuel cell and contains sulfonic acid group; that it is necessary for the conductive separator to be excellent in the general corrosion resistance and particularly in the sulfuric acid resistance; and that more excellent sulfuric acid resistance can be exhibited by SUS304-base austenitic stainless steel added with Cu, or Cu together with N, by SUSXM7-base austenitic stainless steel added with Mo and N, and by SUS316-base austenitic stainless steel added with N, Cu, or N together with Cu.

The present inventors also found that the austenitic stainless steel having large impurity contents of C, Mn, P and S reduces its sulfuric acid resistance due to deposition of MnS, iron phosphides ($Fe_3P, Fe_2P, FeP, FeP_3$), chromium carbide ($Cr_{23}C$) and so forth in grain boundary; that manganese sulfide (MnS) can be reduced by limiting Mn content to 1.00% or less, preferably to 0.45% or less, and S content to 0.005% or less; that chromium carbide $Cr_{23}C$ can be reduced by liming C content to less than 0.02%; that iron phosphide can be reduced by limiting P content to 0.03% or less; and that an excellent sulfuric acid resistance can be obtained when the total of these impurities satisfies a relation of 250×C %+5×Mn %+25×P %+200×S %<10.

The second invention was conceived based on these findings.

That is, an austenitic stainless steel for polymer electrolyte fuel cell of the second invention, in view of solving the aforementioned problem, consists essentially of Cu: 0.10-6.00%, Ni:6.00-13.00%, Cr: 16.00-20.00%, N: 0.005-0.30%, Si: 1.00% or less and Mn: 1.00% or less; and contains, if necessary, either one or both of Ti and Nb respectively in an amount of 1.20% or less and 5×[C %] or more; and the balance of Fe and inevitable impurities.

Another aspect of the austenitic stainless steel for polymer electrolyte fuel cell of the second invention consists essentially of Cu: 0.10-6.00%, Ni:6.00-13.00%, Cr: 16.00-20.00%, Mo: 0.10-4.00%, N: 0.005-0.30%, Si: 1.00% or less and Mn: 1.00% or less; and contains, if necessary, either one or both of Ti and Nb respectively in an amount of 1.20% or less and 5×[C %] or more; and the balance of Fe and inevitable impurities.

Still another aspect of the austenitic stainless steel for polymer electrolyte fuel cell of the second invention consists essentially of Cu: 0.10-6.00%, Ni:10.00-15.00%, Cr: 16.00-18.50%, Mo: 1.00-4.00%, N: 0.005-0.30%, Si: 1.00% or less and Mn: 1.00% or less; and contains, if necessary, either one or both of Ti and Nb respectively in an amount of 1.20% or less and 5×[C %] or more; and the balance of Fe and inevitable impurities.

Still another aspect of the austenitic stainless steel for polymer electrolyte fuel cell of the second invention consists essentially of Cu: 0.10-6.00%, Ni:6.00-13.00%, Cr: 16.00-20.00% and N: 0.005-0.30%; and contains, if necessary, either one or both of Ti and Nb respectively in an amount of 1.20% or less and 5×[C %] or more; and consists also of C: less than 0.02%, Si: 1.00% or less, Mn: 1.00% or less, P: 0.030% or less and S: 0.005% or less, satisfying a relation of 250×[C %]+5×[Mn %]+25×[P %]+200×[S %]<10; and the balance of Fe and inevitable impurities.

Still another aspect of the austenitic stainless steel for polymer electrolyte fuel cell of the second invention consists essentially of Cu: 0.10-6.00%, more preferably 3.00-4.00%, Ni: 6.00-13.00%, Cr: 16.00-20.00%, Mo: 0.10-4.00% and N: 0.005-0.30%; and contains, if necessary, either one or both of Ti and Nb respectively in an amount of 1.20% or less and 5×[C %] or more; and consists also of C: less than 0.02%, Si: 1.00% or less, Mn: 1.00% or less, P: 0.030% or less and S:

0.005% or less, satisfying a relation of 250×[C %]+5×[Mn %]+25×[P %]+200×[S %]<10; and the balance of Fe and inevitable impurities.

Still another aspect of the austenitic stainless steel for polymer electrolyte fuel cell of the second invention consists essentially of Cu: 0.10-6.00%, Ni:10.00-15.00%, Cr: 16.00-18.50%, Mo: 1.00-4.00% and N: 0.005-0.30%; and contains, if necessary, either one or both of Ti and Nb respectively in an amount of 1.20% or less and 5×[C %] or more; and consists also of C: less than 0.02%, Si: 1.00% or less, Mn: 1.00% or less, P: 0.030% or less and S: 0.005% or less, satisfying a relation of 250×[C %]+5×[Mn %]+25×[P %]+200×[S %]<10; and the balance of Fe and inevitable impurities.

A metal component for fuel cell of the second invention is configured using the austenitic stainless steel for polymer-type fuel cell of the second invention, and disposed in contact with a main cell unit comprising a polymer electrolyte film and a pair of electrodes holding it in between. More specifically, the electrode has a plate form and is in contact with the polymer electrolyte film on a first main surface thereof, and the metal component is composed as a separator disposed in contact with the electrode on a second main surface thereof, and has a regular rough on the main surface opposing to the electrode, wherein projected portions of the regular rough are brought into contact with the electrode, and recessed portions of the regular rough serve as a gas flow path through which a fuel gas or an oxidizer gas is supplied to the electrode. The fuel cell of the second invention has a main cell unit which comprises a polymer electrolyte film and a pair of electrodes holding it in between, and the metal component for fuel cell of the second invention.

The austenitic stainless steel for polymer electrolyte fuel cell of the second invention is improved in the sulfuric acid resistance necessary for the polymer electrolyte fuel cell, and in particular for the conductive separator, by allowing the publicly-known austenitic stainless steel to additionally contain any one of, or two or more of Cu, Mo and N.

Adjustment of C: less than 0.02%, Mn: 1.00% or less, P: 0.030% or less and S: 0.005% or less, so as to satisfy a relation of 250×[C %]+5×[Mn %]+25×[P %]+200×[S %]<10, is successful in suppressing production of manganese sulfide, chromium carbide and iron phosphide which tend to lower the sulfuric acid resistance, and also in suppressing deposition thereof in the grain boundary, so that the austenitic stainless steel is improved in the sulfuric acid resistance necessary in particular for the conductive separator.

The next paragraphs will detail the austenitic stainless steel for polymer electrolyte fuel cell of the second invention (also simply referred to as "austenitic stainless steel of the second invention", hereinafter). First, reasons for limitation on the composition of the austenitic stainless steel of the second invention will be explained.

Cu: 0.10-6.00%

Cu produces austenitic phase capable of improving the corrosion resistance, contributes to stabilization of the austenitic phase, and improves cold workability, and is added for these purposes. A content of 0.10% or more is necessary for obtaining these effects, but an excessive content degrades the corrosion resistance and hot workability against expectation. The upper limit is therefore controlled to 6.00%.

Ni: 6.00-13.00%, 10.00-15.00%

Ni produces austenitic phase capable of improving the corrosion resistance, and contributes to stabilization of the austenitic phase, and is added for these purposes. A content of 6.00% or more is necessary for obtaining these effects for a composition of Cu: 0.10-6.00%, Cr: 16.00-20.00% and Mo: 0.10-4.00%, or a content of 10.00% or more is necessary for a composition of Cu: 0.10-6.00%, Cr: 16.00-18.50 and Mo: 1.00-4.00%, but an excessive content degrades the strength and raises the cost. The upper limit is therefore controlled to 13.00% or 15.00%.

Cr: 16.00-20.00%, 16.00-18.50%

Cr improves the corrosion resistance and oxidation resistance, and is added for these purposes. A content of 16.00% or more is necessary for obtaining these effects, but an excessive content degrades the workability and makes the steel more likely to produce σ phase. The upper limit is therefore set to 20.00% for a composition of Cu: 0.10-6.00%, Ni: 6.00-13.00% and Mo: 0.10-4.00%; or set to 18.50% for a composition of Cu: 0.10-6.00%, Ni: 10.00-15.00% and Mo: 1.00-4.00%

Mo: 0.10-4.00%, 1.00-4.00%

Mo improves the corrosion resistance and oxidation resistance, and is added for these purposes. A content of 0.10% or more, optimally 0.5% or more, is necessary for obtaining these effects for a composition of Cu: 0.10-6.00%, Ni: 6.00-13.00% and Cr: 16.00-20.00%; or a content of 1.00% or more is necessary for a composition of Cu: 0.10-6.00%, Ni: 10.00-15.00 and Cr: 16.00-18.50%, but an excessive content degrades the hot workability due to deposition of σ phase, for example. The upper limit is therefore controlled to 4.00%.

N: 0.005-0.30%

N produces austenitic phase capable of improving the corrosion resistance, and contributes to stabilization of the austenitic phase, and is added for these purposes. A content of 0.005% or more is necessary for obtaining these effects, but an excessive content degrades the workability. The upper limit is therefore controlled to 0.30%.

Ti: 5×C %-1.20%, Nb: 5×C %-1.20%

Ti and Nb micronize the crystal grain, increase the strength, and prevent solubilized amount of Cr in the host phase from decreasing through binding with C which undesirably decreases solubilized amount of Cr in the host phase, and are added for these purposes. A content of 5×C % or more is necessary for obtaining these effects, but an excessive content decreases the solubilized amount in solid of N through binding with N. The upper limit is therefore controlled to 1.20%.

C: less than 0.02%

C is an interstitial element contributive to improvement in the strength, but decreases solubilized amount of Cr in the host phase through binding with Cr to thereby form CrC, and this degrades the corrosion resistance, in particular sulfuric acid resistance. The content is preferably controlled to less than 0.02%.

Si: 1.00% or less

Si is an element added as a deoxidizer during the melting, and also as an element for improving the anti-oxidation property, but an excessive content thereof degrades the hot workability. The content is preferably controlled to 1.0% or less.

Mn: 1.00% or less

Mn produces austenitic phase capable of improving the corrosion resistance, and contributes to stabilization of the austenitic phase, but may produce MnS to thereby degrade the corrosion resistance, in particular sulfuric acid resistance. The content is therefore controlled to 1.00% or less, and preferably 0.45% or less.

P: 0.030% or less

P is an impurity, degrades the toughness and hot workability, and produces iron phosphide in the grain boundary to thereby lower the toughness and also lowers the corrosion resistance. The content is therefore controlled to 0.030% or less, and preferably 0.010% or less.

S: 0.005% or less

S is an impurity, and produces MnS and FeS in the grain boundary to thereby degrade the corrosion resistance, in particular sulfuric acid resistance. The content is therefore controlled to 0.005% or less.

$250\times[C\%]+5\times[Mn\%]+25\times[P\%]+200\times[S\%]<10$

Because all of C, Mn, P and S are elements which may deposit in the grain boundary to thereby degrade the sulfuric acid resistance, the composition is designed so that the formula in the above gives a value of less than 10, because the value less than 10, as well as the contents of the individual elements adjusted to the above-described ranges can further improve the sulfuric acid resistance.

Possible applications of the austenitic stainless steel of the second invention include conductive separator, current collector component and so forth for polymer electrolyte fuel cell, having a noble metal film formed thereon, and used in a style as being covered with a noble metal film on the surface thereof.

The austenitic stainless steel of the second invention is used after being reduced in the hardness typically by heating after or before the surface thereof is covered with the noble metal film, so that it can be shaped, with an excellent process accuracy, into the conductive separator, current collector component and so forth for polymer electrolyte fuel cell.

Next, a method of manufacturing the austenitic stainless steel of the second invention will be explained.

The austenitic stainless steel of the second invention has a composition of SUS304, 304L, XM7, 316 or 316L, added with any one of, or two or more of Cu, Mo and N, or added with the above element(s) together with C: less than 0.02%, Mn: 1.0% or less, P: 0.030% or less and S: 0.005% or less, so that it can be manufactured similarly to SUS304, 304L, XM7, 316 or 316L.

Third Invention

The third invention was conceived after our extensive investigations and researches, based on an idea of reducing surface roughness of a cover film of a noble metal formed so as to cover the metal base, by smoothening through rolling and compressing, or by forming the noble metal film after the surface of the metal base plate is smoothened. That is, the polymer electrolyte fuel cell material of the third invention comprises a plate material composed of an Fe-base alloy, Ni-base alloy, Ti or Ti-base alloy, and a cover film of a noble metal covering the surface thereof, wherein the cover film on the plate material has a surface roughness as expressed in $R_{max}$ of 1.5 μm or less.

Examples of the above-described Fe-base alloy include common steel, various special steels, stainless steel and Fe—Ni-base alloys; examples of the above-described Ni-base alloy include Inconel 800, ditto 825, ditto 600, ditto 625, ditto 690, Hastelloy C276 and NCH1; and examples of the above-described Ti-base alloy include Ti-22 wt % V-4wt % Al, Ti-0.2 wt % Pd and Ti-6 wt % Al-4 wt % V. Examples of the noble metal include Au, Ag, Pt, Pd, Rh and Ir, and alloy having any of these elements as a base element. The surface of the plate material denotes at least either one of the top surface and back surface. Examples of the cell material include separator, current collector plate, processed plate and so forth for the cell.

The plate material generally has a micro-irregularities formed on the surface thereof, due to transfer of regular roughs on the circumferential surface of the rolling roll, and loss of the metal component caused by surface treatment such as acid cleaning or by heat treatment such as annealing. It is also anticipated that the noble metal film is less adhesive to the grain boundary of the plate material, where deposits such as carbide and sulfide, and impurity elements are condensed. The above-described cell material will have the surface of regular rough conforming to the micro-irregularity of the surface of the plate material, and having an emphasized profile, formed once on the surface of the noble metal film, but the surface regular rough is smoothened by compression typically by rolling described later. What is better, the surface of the noble metal film is as smooth as having an surface roughness as expressed in $R_{max}$ of 1.5 μm or less, the natural potential is averaged over the entire surface, wherein the recessed portions having only a thin film formed thereon are supplied with the film from the projected portions, and thereby the thickness and the plate material per se is smoothened. As a consequence, the surface of the film no more has a portion where the thickness thereof is extremely small, and can exhibit an excellent corrosion resistance. Another possible process is such that the surface of the plate material used as a base is subjected, before being covered with the cover film of a noble metal, electrolytic polishing to thereby smoothen the surface and average the regular rough, and this is successful in obtaining the effect similarly to as described in the above, because the surface of the plate material is planarized together with the noble metal film, after coverage with a noble metal.

The cell material of the third invention also includes a polymer electrolyte fuel cell material which shows, in an anti-corrosion test, an amount of Fe ion elution of 0.15 mg/0.4 liter or less, and an amount of Ni ion elution of 0.01 mg/0.4 liter or less. According to the invention, the cell material can exhibit an excellent corrosion resistance in a more reliable manner even when it is exposed to an extremely corrosive environment for a long duration of time as a separator or current collector plate of the cell. The amount of Fe ion elution exceeding 0.15 mg/0.4 liter or the amount of Ni ion elution exceeding 0.01 mg/0.4 will result in the cell material having only an insufficient corrosion resistance for the practical use, so that the above-described allowable ranges of the elution are determined so as to avoid the undesirable ranges.

A first method of manufacturing a polymer electrolyte fuel cell material of the third invention comprises a coverage step of forming a cover film of a noble metal so as to cover the surface of a plate material composed of an Fe-base alloy, Ni-base alloy, Ti or Ti-base alloy; and a rolling step of rolling the plate material having the surface covered with the cover film of a noble metal, between a pair of rolls having a surface roughness as expressed in $R_{max}$ of 1.5 μm or less. The method makes it possible to fabricate the cell material covered with the noble metal layer and having a smooth surface in a reliable-and-efficient manner. The above-described coverage step using a noble metal is carried out by plating, vacuum evaporation and so forth.

The third invention also includes a method of manufacturing a polymer electrolyte fuel cell material, in which the above-described rolling step is carried out under a draft of 1% or more. This makes it possible to smoothen the surface of the cover film of a noble metal, which is formed with a micro-irregularity on the surface of the plate material, such as having a surface roughness as expressed in $R_{max}$ of as small as 1.5 μm or less in a reliable manner. The draft less than 1% may sometimes fail in suppressing the surface roughness as expressed in $R_{max}$ of the cover film of a noble metal formed so as to cover the plate material to as small as 1.5 μm, so that this case is omitted. In further detail, a desirable range of the draft is 5 to 50%, more preferably 10 to 30%, and 80% in maximum.

The second method of manufacturing a polymer electrolyte fuel cell material of the third invention comprises a smoothening step of smoothening a plate material composed of an Fe-base alloy, Ni-base alloy, Ti or Ti-base alloy so as to attain a surface roughness as expressed in $R_{max}$ of 1.5 μm or less; and a coverage step of forming a noble metal film so as to cover the surface of the plate material. Because the surface of the plate material per se is preliminarily smoothened in this method, the cover film of a noble metal can be formed in a smooth and more uniform manner.

The above-described smoothening step can adopt electrolytic polishing or rolling using rolls having a surface roughness as expressed in $R_{max}$ of 1.5 μm or less, and thereby, it is made possible to adjust a surface roughness as expressed in $R_{max}$ of the plate material to as small as 1.5 μm or less. The rolling using the rolls having $R_{max}$ of 1.5 μm or less, carried out after the smoothening and the coverage with the noble metal film, makes it possible to obtain a film having a more uniform thickness and a more excellent adhesiveness. The draft in this case may be the same as described in the above.

A metal component for fuel cell of the third invention is configured by using the austenitic stainless steel for polymer electrolyte fuel cell of the third invention, and is to be disposed in contact with a main cell unit comprising a polymer electrolyte film and a pair of electrodes holding it in between. More specifically, the electrode has a plate form and is in contact with the polymer electrolyte film on a first main surface thereof, and the metal component is composed as a separator disposed in contact with the electrode on a second main surface thereof, having a regular rough on the main surface opposing to the electrode, projected portions of the regular rough being brought into contact with the electrode, and recessed portions of the regular rough serving as a gas flow path through which a fuel gas or an oxidizer gas is supplied to the electrode. A fuel cell of the third invention has a main cell unit which comprises a polymer electrolyte film and a pair of electrodes holding it in between, and the metal component for fuel cell of the third invention.

Fourth Invention

A corrosion-resistant conductive component of the fourth invention comprises a metal base and a noble metal film of 100 nm thick or less formed on at least a part of the surface of the metal base, wherein the noble metal layer and an intermediate layer formed between the base and the noble metal layer have impurity contents of C: 1.5% or less, P: 1.5% or less, O: 1.5% or less and S: 1.5% or less, which are restricted to C+P+O+S: 4.0% or less. Meanings of these limitative values will be supported by practical data described later. The fuel cell of the fourth invention has a main cell unit which comprises a polymer electrolyte film and a pair of electrodes holding it in between, and the metal separator for fuel cell composed of the corrosion resistant conductive component of the fourth invention.

A fourth invention's method of manufacturing the corrosion resistant conductive component having the noble metal film of a low impurity content comprises the steps of removing a contamination film which resides on the surface of the metal base by physical and/or chemical processes so as to allow a clean surface to expose, and forming thereon a cover film of a noble metal immediately thereafter, before the surface is contaminated again.

The base metal can arbitrarily be selected from those which can completely be covered with a noble metal in portions of the surface for which corrosion resistance is required, wherein it is advantageous that the base per se has a certain level of corrosion resistance. In this point of view, stainless steel, in particular austenitic stainless steel excellent in the corrosion resistance, is preferable.

Use of the austenitic stainless steel for the base allows Fe, Cr and Ni, which are major components thereof, to appear in the intermediate layer between the base and noble metal layer, and even in the noble metal layer. It was made clear that ratio of contents of these elements, thus appear in the noble metal layer and in the intermediate layer, is particularly important for the corrosion resistance. More specifically, the noble metal layer and the intermediate layer preferably have a maximum Cr/Fe ratio of 3 or less, and a maximum Ni/Fe ratio of 2 or less. This is also supported by data described below.

The noble metal composing the noble metal film may be any one element selected from Au, Pt, Pd, Rh and Ru, and mixtures of these elements. It still may be alloys mainly composed of these elements, so far as they keep characteristics of noble metal.

Both of wet and dry processes are applicable as the physical and/or chemical processes of removing a contamination film, which resides on the surface of the metal base and composed of foreign matters such as passivation film and oxide film, so as to allow a clean surface to expose. A representative process of the former is cleaning using an electrolytic polishing solution, and a representative process of the latter is vacuum ion irradiation. The "electrolytic polishing solution" includes not only those generally used for electrolytic polishing, but also corrosive solution such as a 20% sulfuric acid solution.

The phase of "immediately thereafter, before the surface is contaminated again" means, for the case of stainless steel, an interval of time "from removal of the surface passivation film to re-formation of the passivation film", and this is preferably short as possible. In a specific way of speaking referring to the actual operations, it is necessary to start the formation of the noble metal film within one minute or around, whichever process of wet or dry should be used for the cleaning. In view of shortening the interval, the cleaning carried out by the wet process is preferably followed by the formation of the noble metal film again based on the wet process, such as electroplating or electroless plating, and the cleaning carried out by the dry process is preferably followed by the formation of the noble metal film again based on the dry process, such as sputtering or ion-assisted vacuum evaporation, which are categorized in vacuum film growth process.

BEST MODES FOR CARRYING OUT THE INVENTION

Figure 1:
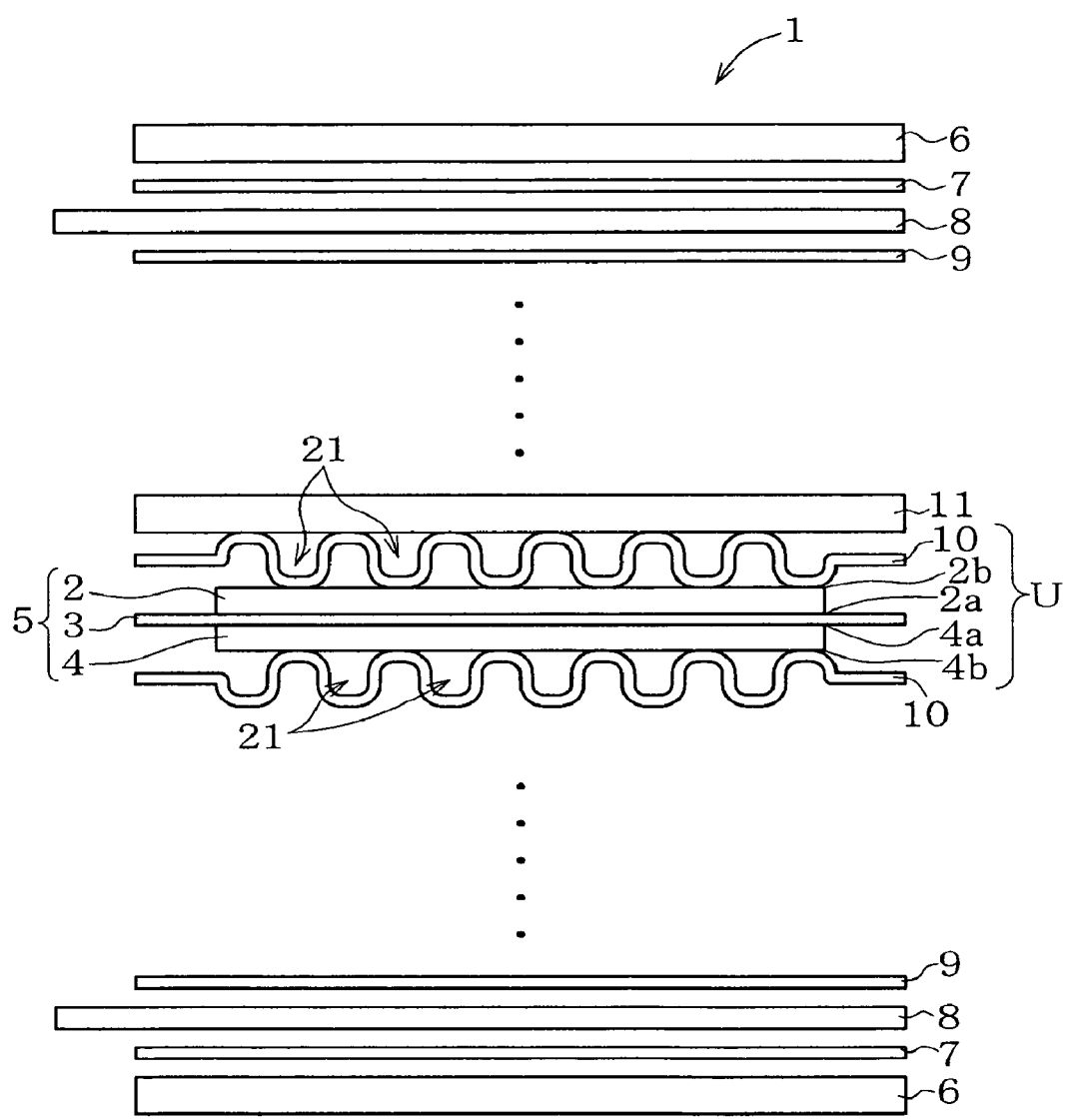
FIG. 1 is a schematic drawing showing an exemplary configuration of a fuel cell of the first invention.

FIG. 1 explains the outlines of a metal separator for fuel cell commonly applicable to the first, second, third and fourth inventions, and an exemplary mode of a fuel cell using the same. The fuel cell 1 is a polymer electrolyte fuel cell adopting a polymer electrolyte film 3. More specifically, the polymer electrolyte film 3 may be composed of a fluorine-containing resin containing sulfonic acid groups. The fuel cell 1 has a polymer electrolyte film 3 and a pair of electrodes 2,4 holding it in between, and therefore has a main cell unit 5 which comprises the polymer electrolyte film 3 and the electrodes 2, 4. The electrodes 2, 4 are brought into contact with the polymer electrolyte film 3 on their first main surfaces 2a, 4a, and plate-formed separators 10 are disposed on the outer sides of the electrodes 2, 4 so as to be brought into contact therewith on their second main surfaces 2b, 4b. Each of the separators 10 plays a role of connecting the main cell units 5 in series, and is disposed so as to supply a fuel gas and oxidizer gas to the main cell unit 5. In this mode of embodiment, the separator 10 corresponds to a metal component for fuel gas of the first invention. It is to be noted that a gasket, not shown in FIG. 1, is disposed between the main cell unit 5 and each of the separators 10 in order to prevent leakage of the fuel gas and oxidizer gas. The main cell unit 5 and the separators 10 composes a unit cell U, and a plurality of the unit cells U are stacked while individually placing a cooling water flowing substrate 11 (composed of a conductive material such as graphite) in between, to thereby configure a fuel cell stack 1. The unit cells U are stacked in, for example, the number of 50 to 400 or around, and respectively on both ends of the stack, there are disposed, as viewed from the side in contact with the unit cell U, a conductive sheet 9, a current collector plate 8, an insulating sheet 7, and a tightening plate 6, to thereby configure a fuel cell stack 1. The current collector plate 8 and a plurality of separators 10 are connected in series, so as to collect current from a plurality of main cell units 5. It is defined now that the above-described unit cell U and fuel cell stack 1 are also included in the concept of the fuel cell in this patent specification. It is to be noted that FIG. 1 shows the individual components, including the conductive sheet 9, current collector plate 8, insulating sheet 7 and tightening plate 6, are illustrated as being departed from each other, but these components in practice are tightened with each other using bolts, for example.

Figure 2A:
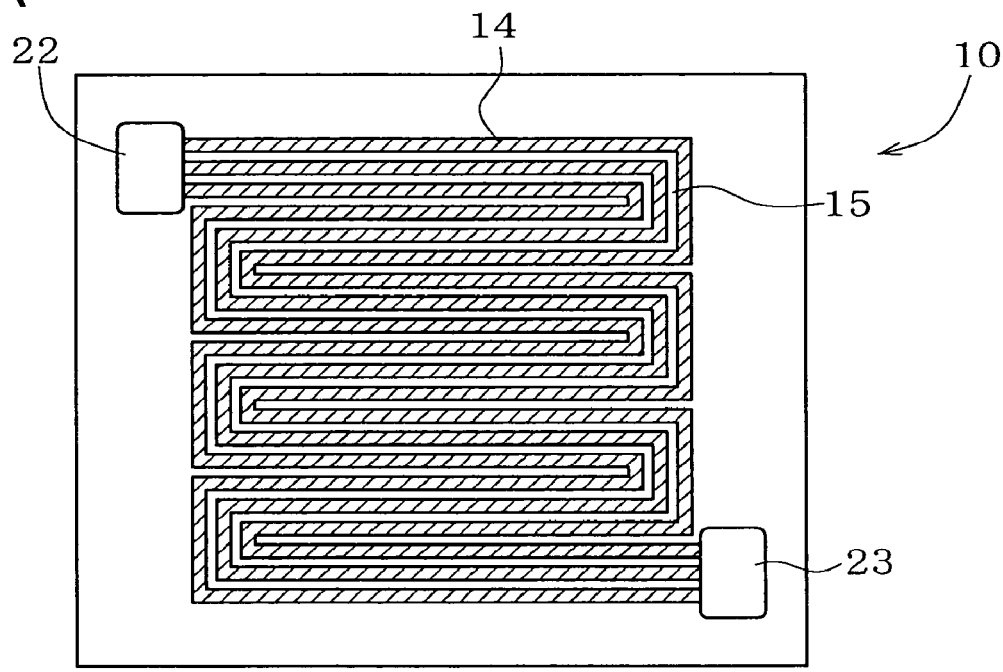
FIG. 2A is a first schematic drawing showing an exemplary configuration of a metal component for fuel cell of the first invention.
Figure 2B:
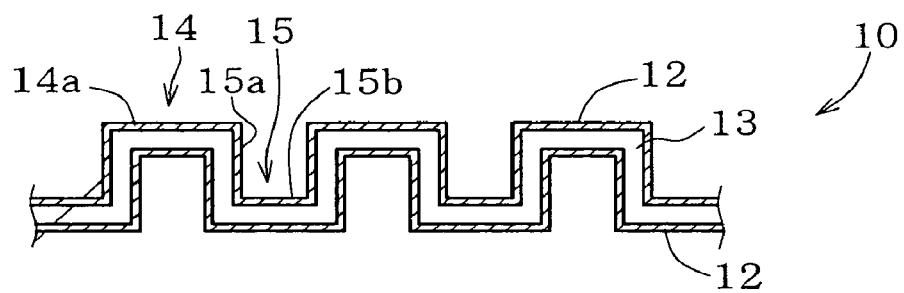
FIG. 2B is a second schematic drawing showing an exemplary configuration of the metal component for fuel cell of the first invention.
Figure 2C:
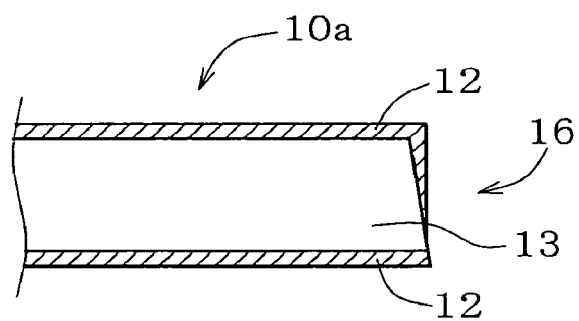
FIG. 2C is a third schematic drawing showing an exemplary configuration of the metal component for fuel cell of the first invention.

FIG. 2A to FIG. 2C show the outlines of the separator 10. As shown in FIG. 2A, the separators 10 are shaped in a plate form, have a regular rough formed on the main surfaces thereof, and are disposed so as to make the end sides of the projected portions 14 of the separators 10 contact with the electrodes 2, 4. The recessed portions of each separator 10 serve as gas a flow path 21 (see also FIG. 1) through which a fuel gas or an oxidizer gas is supplied to the electrodes 2, 4. The gas flow path 21 has openings formed on both ends thereof, which serve as a reaction gas inlet port 22 and a reaction gas outlet port 23, respectively. The separators 10 are stacked so that the reaction gas inlet ports 22 and reaction gas outlet ports 23 formed on the individual separators 10 are aligned at the same positions.

The paragraphs below will describe modes of embodiments specific to the individual inventions.

First Invention

As shown in FIG. 2B, the separator 10 comprises a metal base 13 and an Au film 12 formed on the main surface thereof, wherein the Au film 12 is formed not only on top surfaces 14a of the projected portions 14, but also on the side faces 15a and bottoms 15b of the recessed portions 15 (non-contact regions) which are not planned to contact with the electrodes 2, 4. Thickness of the Au film 12 is adjusted to 1 to 500 nm. The Au film 12 is an Au-plated film 12.

Defining now the region of the metal base 13 not brought into contact with the electrodes 2, 4 is non-contact region, 90% or more of the non-contact region is provided as an Au-plated region having the Au plated film 12 formed thereon. Because the Au-plated film 12 is thus formed in 90% or more of the non-contact region with the electrode, the recessed portions, through which the fuel gas or the oxidizer gas flows, is successfully suppressed in the corrosion due to the oxidizer gas, or due to sulfuric acid ion eluted from the polymer electrolyte film 3.

The separator 10 has, as shown in FIG. 2C, a cutting plane 16 as an end face 16 stretched up to the main surface 10a. The cutting plane 16 has a region where the Au plated film 12 is not formed thereon, and the metal base 13 of the separator 10 is therefore exposed therein. Width of the region where the metal base 13 exposes is adjusted to 1 mm or less.

Figure 7A:
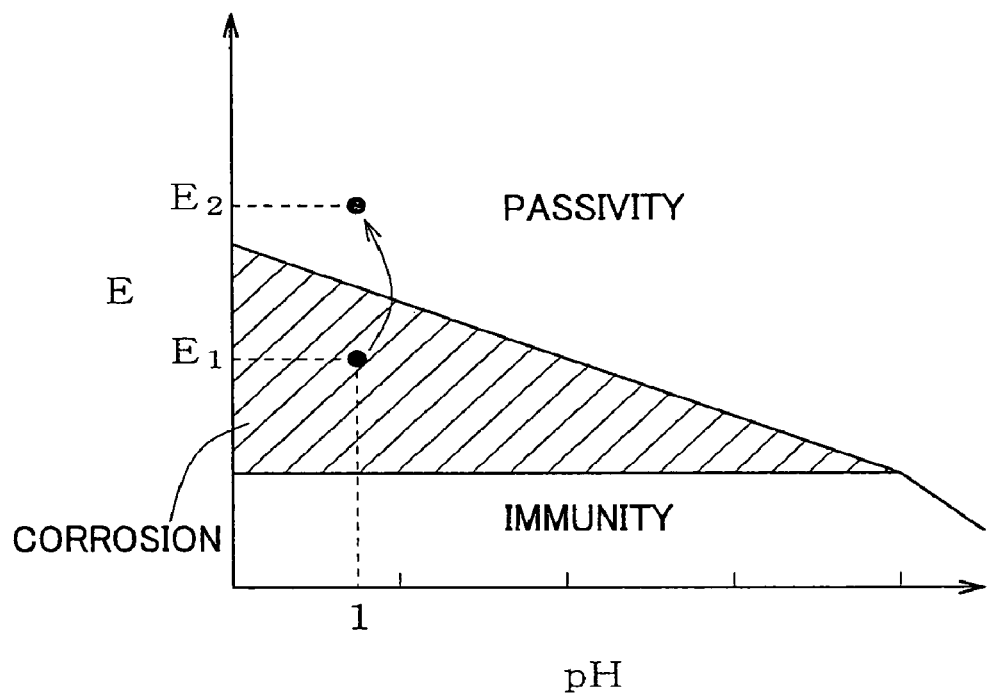
FIG. 7A is a first drawing explaining a mechanism of preventing corrosion of a metal base.
Figure 7B:
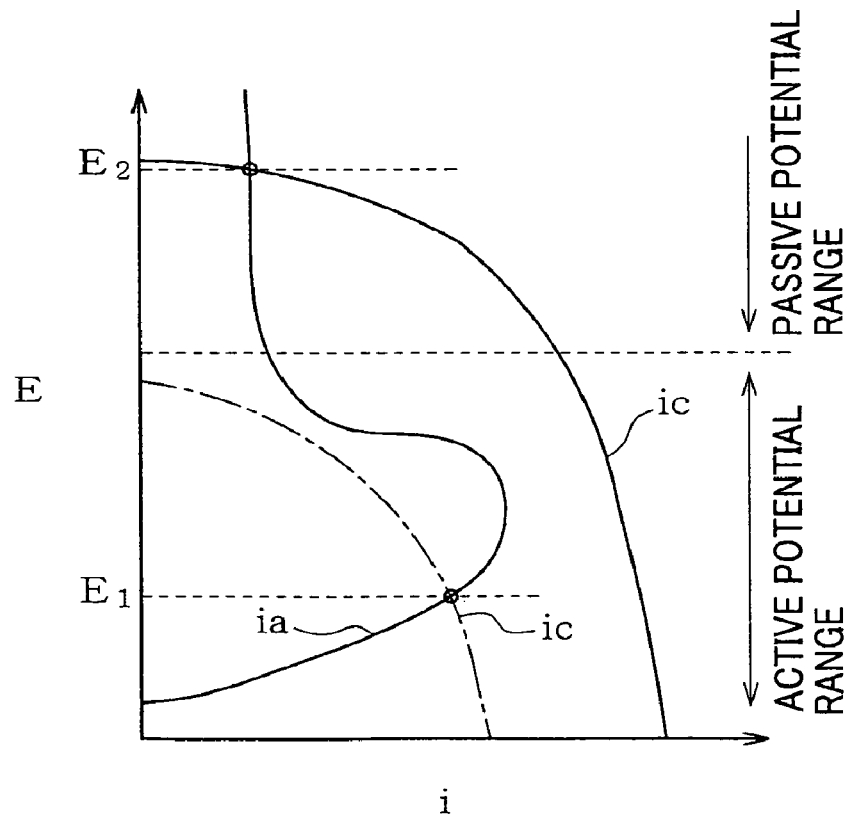
FIG. 7B is a second drawing explaining a mechanism of preventing corrosion of a metal base.

The metal base 13 composing the separator 10 shows, as described in the above, at least the active potential region and passive potential region in the anode polarization curve shown in FIG. 7B, measured under a pH1 condition.

The Au plated film 12 is formed directly on the metal base 13. Au plating on the surface of a metal generally needs an under-plated film formed between the metal base and Au plated film 12. The under-plated film contributes to formation of the Au plated film 12 having no pinholes or the like formed therein. However in the first invention, there is no need of suppressing the pinholes formed in the Au plated film, and the Au film can directly be formed without forming the under-plated film. Thus-formed separator 10 as a metal component for fuel cell is therefore configured so that exposed regions of the metal base 13 are formed in a discrete manner in the Au plated region having the Au plated film 12 formed therein. This simplifies the fabrication process and successfully reduces the cost.

The metal base 13 can specifically be configured as containing at least Cr. Cr is a well-known passivation metal, and the metal base 13 containing Cr can form the passivation potential region in the anode polarization curve as shown in FIG. 7B. It is more preferable herein to satisfy a relation of $W_{Cr}+3.3W_{Mo} \geq 10$, where $W_{Cr}$ (% by weight) is Cr content, and $W_{Mo}$(% by weight) is Mo content. In this way, also Mo capable of promoting passivation of metal may be contained in the metal base 13, in addition to Cr. Assuming now $W_{Cr}+3.3W_{Mo}$ as passivation performance, a passivation performance of 10% or more by weight is enough to shift the electrode potential into the passivation potential region, even if the metal base is exposed to a corrosive environment of pH1, by virtue of formation of a local cell with the Au plated film 12. The Fe-base alloy for composing the metal base 13 may also be, in particular, stainless steel. The metal base 13 may still also be composed of Ti, or Ti-base alloy.

Specific examples which can be adopted as metal base of the stainless steel; Fe-base alloy or Ni-base alloy; and Ti or Ti-base alloy will be enumerated below:

Ti or Ti-base alloy: pure Ti, Ti-22V-4Al;

stainless steel: SUS430, SUS304, SUS305, SUSXM7, SUS316, SUS316L, SUS317, SUS317L, SUS317J1, SUS310S and SUS317J5L;

Fe-base alloy: Incoloy 800; and

Ni-base alloy: Inconel 600, NCH1.

Figure 3:
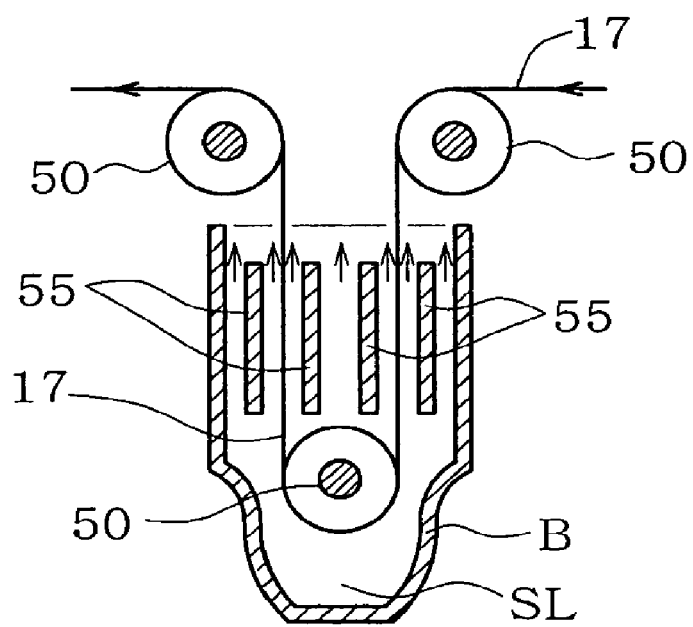
FIG. 3 is a schematic drawing showing an apparatus for forming an Au film on the surface of a metal base.

Next paragraphs will explain a method of manufacturing the above-described separator 10. It is to be noted that the metal base 13 is preliminarily formed in a band form. The Au film 12 is formed on the main surface of the band-formed metal base 13, and the metal base 13 is then shaped into the separator 10. The Au film can be formed by electroplating. FIG. 3 shows the outlines of an apparatus for forming the Au film 12 by electroplating on the band-formed metal base 17. A plating bath B has a plating solution SL contained therein. The plating solution SL for forming the Au plated film 12 can typically be composed of a gold potassium cyanide solution, while being not limited thereto. The band-formed metal base 17 is introduced from an feeding roll 50 into the plating bath B, and allowed it to run between electrodes 55, 55 which are held in the plating bath B and supplied with current, and thereby the Au plated film 12 can be formed on the surface of thus-introduced metal base 17. Bath temperature, concentration of the solution, feeding speed of the metal base 17 and so forth herein are appropriately adjusted so that the Au plated film 12 is formed to a thickness of 1 to 500 nm. Formation of the Au plated film 12 on the band-formed metal base 17 before being processed makes it possible to form the Au plated film 12 over a wide area at a time, and this is hopeful for an improved efficiency in the manufacturing. In this mode of embodiment in no need of selectively forming the Au plated film 12, any special treatment therefor is not necessary at all, and thereby the Au plated film 12 is formed over the entire portion of the main surface of the metal base 17.

Figure 4:
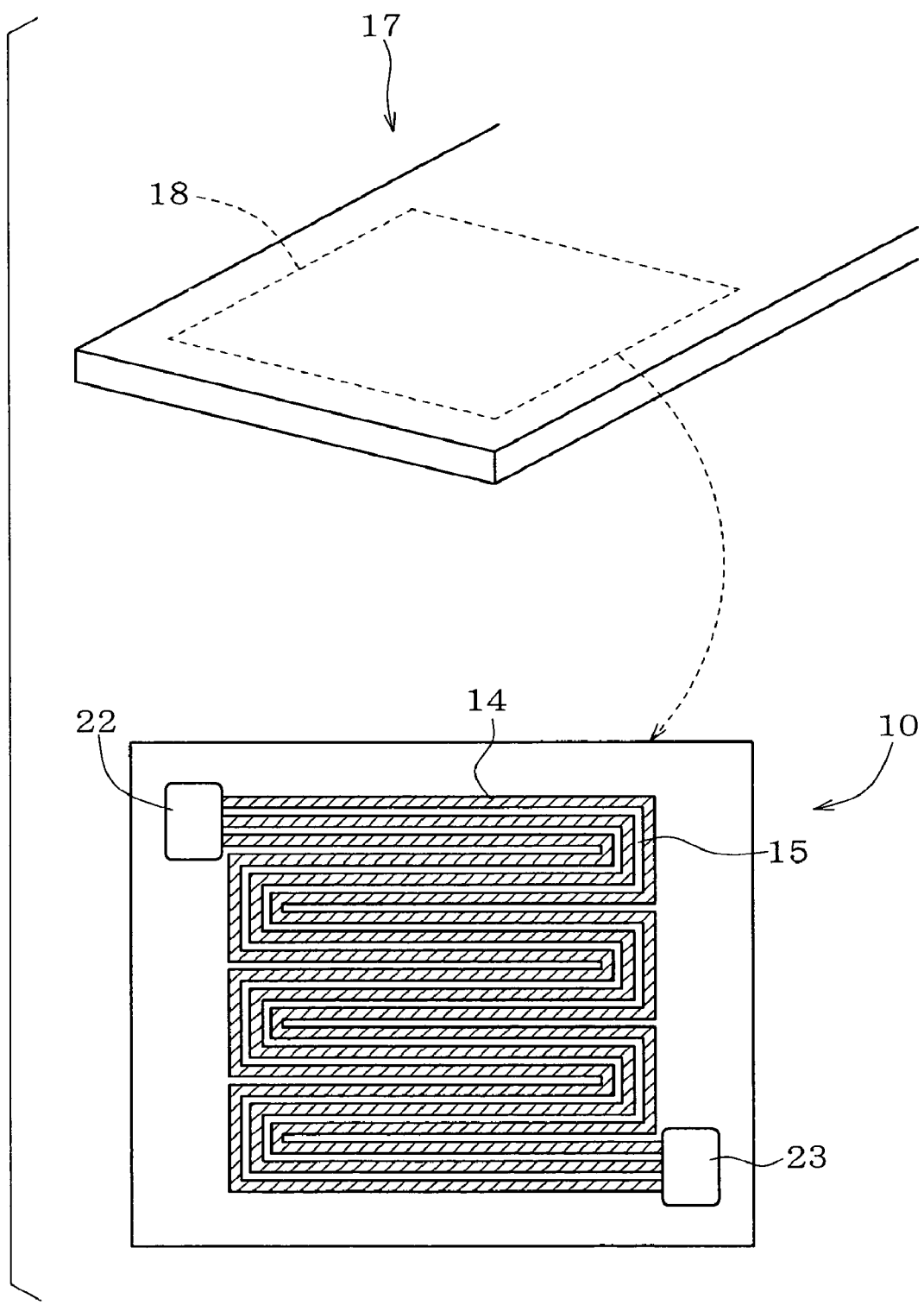
FIG. 4 is a schematic drawing conceptually showing a fabrication method of the first invention.

After the Au plated film 12 is formed on the band-formed metal base 17 as described in the above, the metal base 17 is then cut along a planned cutting line 18 reflecting a contour of the separator 10, as shown in FIG. 4. The metal base 10, having the cutting plane 16 formed as an end face 16 stretched up to said main surface 10a, is thus obtained. The individual metal bases 10 thus cut out are pressed so as to form the regular rough on the main surface thereof, and thereby the separators 10 for fuel cell can be obtained.

Figure 5A:
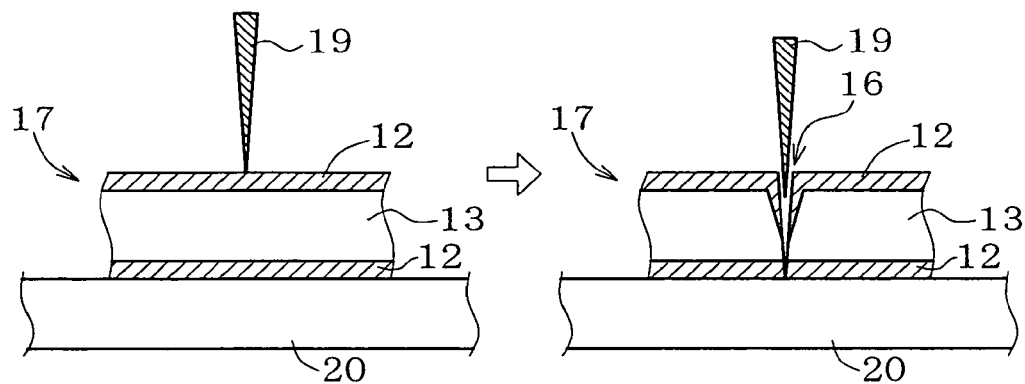
FIG. 5A is a drawing showing a first example of method of cutting a band-formed component.
Figure 5B:
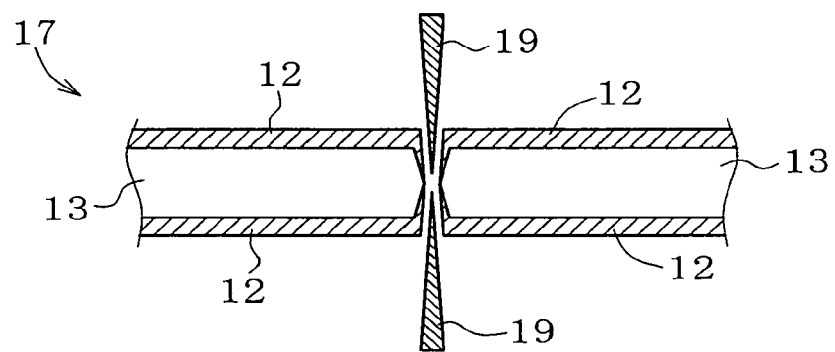
FIG. 5B is a drawing showing a second example of method of cutting a band-formed component.

In this mode of embodiment, the metal base 17 is cut, as shown in FIG. 5A, by placing the band-formed metal base 17 on a stage 20, placing a cutting edge 19 on the surface of the metal base 17, and by pressing the cutting edge 19 into the metal base 17 to thereby effect cutting. By this process, the Au plated film 12 extends along the end face 16, which is formed as a cutting plane 16, of the metal base 13 so as to cover a part of the end face 16. In particular, the above-described process is successful in narrowing the width of a region, where the metal base 13 exposes, in the cutting plane 16 (end face 16) to as small as 1 mm or less. As is clear from the above, in this mode of embodiment, the most part of the cutting plane 16 (end face 16) is covered with the Au plated film 12, and a minimum area of the metal base 13 is exposed in a part of the cutting plane 16 (end face 16). When the metal base 13 having the Au plated film 12 formed thereon is cut, it is also allowable, as shown in FIG. 5B, to place the cutting edges 19 on both main surfaces of the band-formed metal base 17, and the opposing cutting edges 19 are then brought closer to each other, to thereby cut the metal base 17. This makes it possible to further reduce the amount of exposure smaller than that in the method shown in FIG. 5A.

Figure 6A:
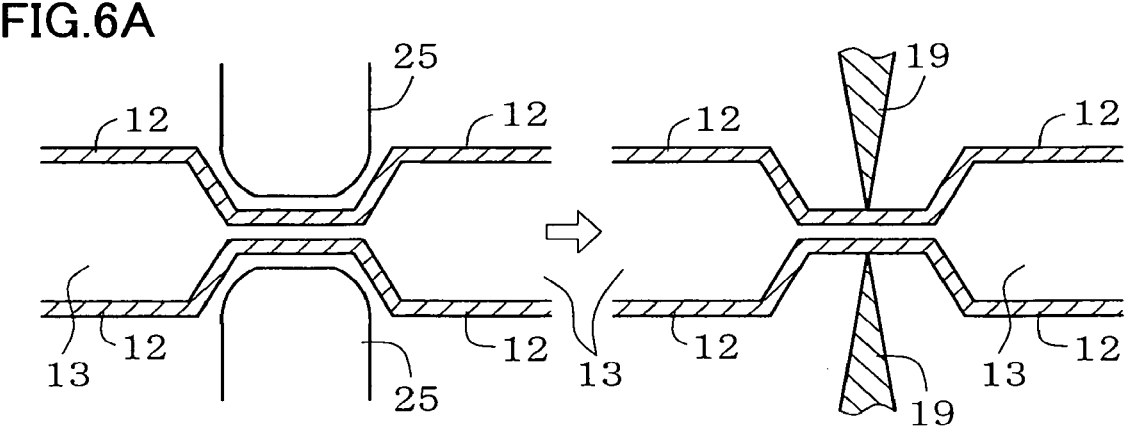
FIG. 6A is a drawing showing a third example of method of cutting a band-formed component.
Figure 6B:
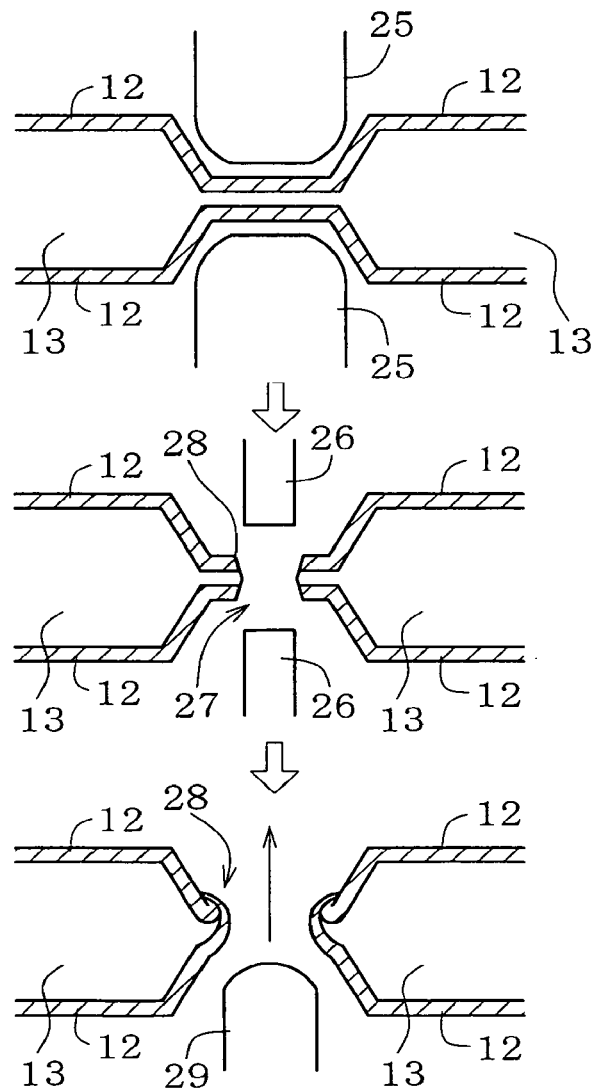
FIG. 6B is a drawing showing a fourth example of method of cutting a band-formed component.

For the case where the metal base 13 is cut from both surfaces thereof by the cutting edges 19, it is also allowable to adopt a method shown in FIG. 6A. That is, the metal base is preliminarily thinned, using a compression member 25, in the vicinity of the planned cutting line as shown in FIG. 4, and the cutting edges 19 are placed on the thinned planned cutting line, and the metal base is the cut. The separator for fuel cell will have, formed therein, also openings such as gas outlet port 23, and alignment holes for the convenience of stacking. This sort of opening can be formed by preliminarily thinning a region around a site of formation of the opening by means of the compression member 25, and then by punching the region off using a press machine 26 as shown in FIG. 6B. For the case where the region around the planned cutting line is thinned as described in the above, it is preferable to thin the metal base 13 to as thin as 0.1 mm or less. The methods shown in FIGS. 6A and 6B make it possible to narrow the width of exposed surface of the metal base 13 in the end face 16 of the separator 10 or in the end face 28 of the opening 27 to as small as 1 mm or less, and further to as small as 0.1 mm or less.

For the case where the opening 27 is formed by the above-described method shown in FIG. 6B, it is preferable to use a rod component 29, having a nearly similar geometry with that of the opening 27 to be formed but larger in the cross-sectional geometry, as being inserted into the opening 27 so that the sectional geometry corresponds with the geometry of the opening 27. This makes the edge of the opening 27 folded in the direction of insertion of the rod component 29, and makes it possible to further reduce the exposed region of the metal base 13 in the end face 28 of the opening 27. It is even possible to completely hide the metal base 13. It is to be noted that, also for the case shown in FIG. 6A, the edge can be rounded in a similar manner.

Although the present mode of embodiment explains the separator 10 as the metal component for fuel cell, the first invention is by no means limited thereto, and is applicable to any other metal components which are used for fuel cells and possibly corroded.

Suppression of the corrosion of the metal base 13 is ascribable to formation of the local cell, based on contact between the Au film 12 and metal base 13 in the corrosive environment. It is therefore also allowable, when the metal base 13, which is the metal component for fuel cell, is incorporated into the fuel cell, to adopt a configuration in which the Au film 12 is preliminarily formed on the surface of a component which is possibly brought into contact with the surface of the metal base 13, so as to allow the metal base 13 and Au film 12 to contact with each other when the both are assembled to configure the fuel cell. For the metal component for fuel cell used herein, it is also allowable to adopt the metal base 13 capable of forming the passive potential region in the anode polarization curve measured under the pH1 condition as described in the above, having no Au film 12 formed on the surface thereof.

That is, a fuel cell 1 adoptable herein is such as having a main cell unit 5 which comprises a polymer electrolyte film 3 as an electrolyte and a pair of electrodes 2, 4 holding it in between, and having a metal component as the metal component for fuel cell, wherein a metal catalyst, which is noble than the metal composing the surficial portion of the metal component and is capable of activating oxygen reducing reaction and hydrogen ion reducing reaction in the corrosion reaction which proceed on the surficial portion of the metal component, is immobilized on the surface of a support which is a separate component from the metal member, and the metal member is brought into contact with the support component while placing the metal catalyst in between.

Figure 8:
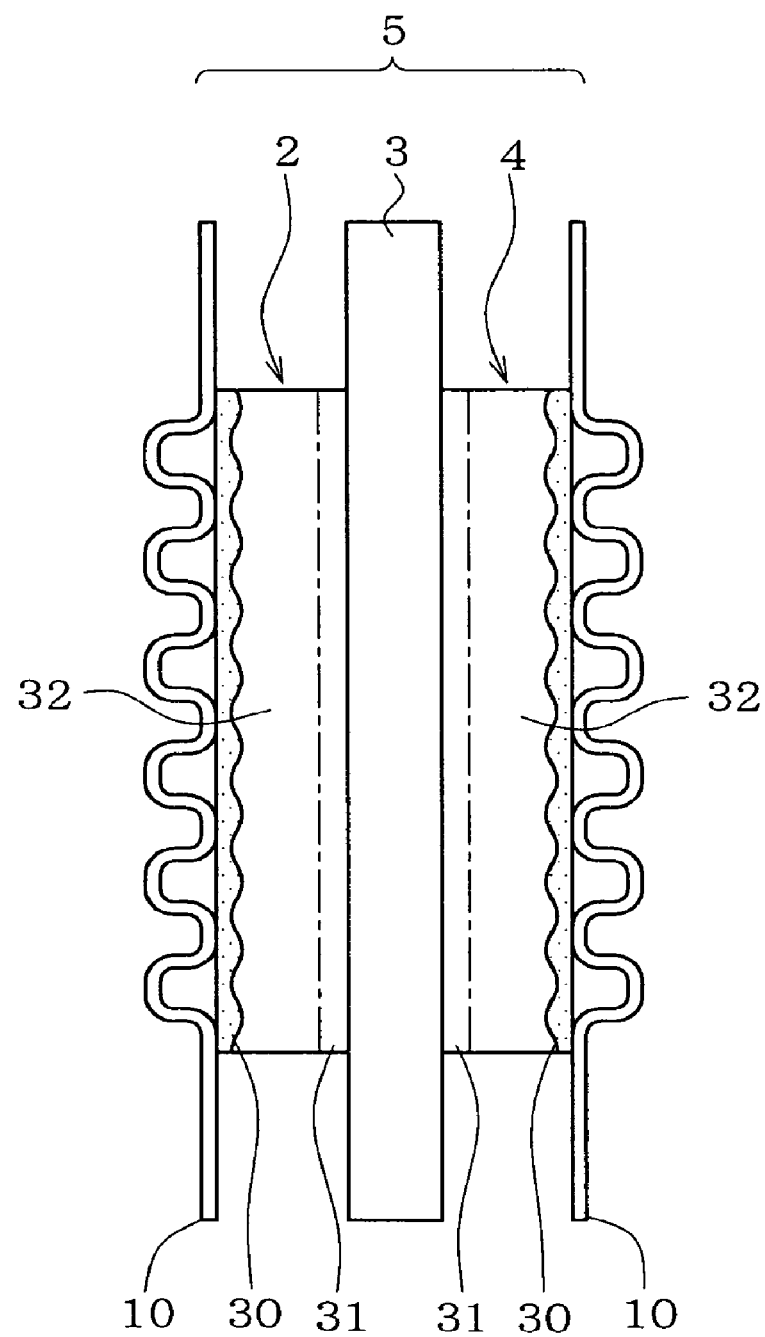
FIG. 8 is a schematic drawing showing an exemplary mode of contact between the surface of a separator and an Au film.

Referring now to the case where the metal component is the separator 10, the following configuration can be adopted. That is, in the unit cell U shown in FIG. 1, a gas diffusion layer 32 is provided, as shown in FIG. 8, to each of the electrodes 2, 4 on the side thereof brought into contact with the separator 10, and a film of Au as the metal catalyst is formed on each of the gas diffusion layers 32 on the side thereof brought into contact with the separator 10. Contact of the Au film 30 with the surface of the separator 10 forms a local cell, and thereby corrosion of the separator 10 can be suppressed even when the separator 10 is in direct contact with moisture contained in the polymer electrolyte film 3 or with the oxidizer gas. The gas diffusion layer 32 herein functions as the support.

The gas diffusion layer 32 is provided so as to allow the fuel gas or oxidizer gas, supplied through the recessed portions 15 (gas flow path 21) to the electrodes 2, 4 of the separator 10, to enter a catalyst layer 31 provided on each of the electrodes 2, 4 on the side thereof in contact with the polymer electrolyte film 3, from a more wide area. When the fuel gas or oxidizer gas passed through the gas diffusion layer 32 reaches and enters the catalyst layer 31, the gases are oxidized or reduced to thereby produce electromotive force. The catalyst layer 31 has, as being immobilized thereon, the catalyst for activating the cell reactions (oxidation reaction at the anode and reduction reaction at the cathode) at the electrodes 2, 4. Pt is the catalyst adopted herein in this mode of embodiment, as the catalyst for activating the cell reactions.

The Au film 30 can be configured using a porous material on the gas diffusion layer 32. This is because the Au film 30 should not intercept the passage of the fuel gas and oxidizer gas. For this reason, the metal catalyst 30 is partially brought into contact with the surface of the separator 10 in the portions (top surfaces of the projected portions 14 of the separator 10) where the gas diffusion layer 32 and separator 10 are brought into contact.

It is also allowable to exemplify a configuration in which an unillustrated porous conductive sheet is disposed respectively between the electrodes 2, 4 and separator 10 so as to respectively contact with the electrodes 2, 4 and separator 10, a film of Au as the metal catalyst is formed on the porous conductive sheet on the surface thereof in contact with the separator 10, to thereby use the porous conductive sheet as the support.

It is still also allowable to configure the porous conductive sheet such as being composed of a metal less noble than Au as the metal catalyst, and as having the Au films supported on both surfaces of the porous conductive sheet. The porous conductive sheet herein can be composed of an alloy of a metal less noble than Au as the metal catalyst and the metal catalyst (Au).

It is still also allowable to form the gas diffusion layer on the electrodes on the sides thereof in contact with the separators, and thereby the gas diffusion layer is formed as the porous conductive sheet.

Second Invention

This invention relates mainly to material characters, and will be detailed later referring to experimental results. Specific examples of the metal separator for fuel cell and fuel cell using the same were explained previously referring to FIG. 1 and FIG. 2A to FIG. 2C, as embodiments common for those of other inventions.

Third Invention

Figure 9A:
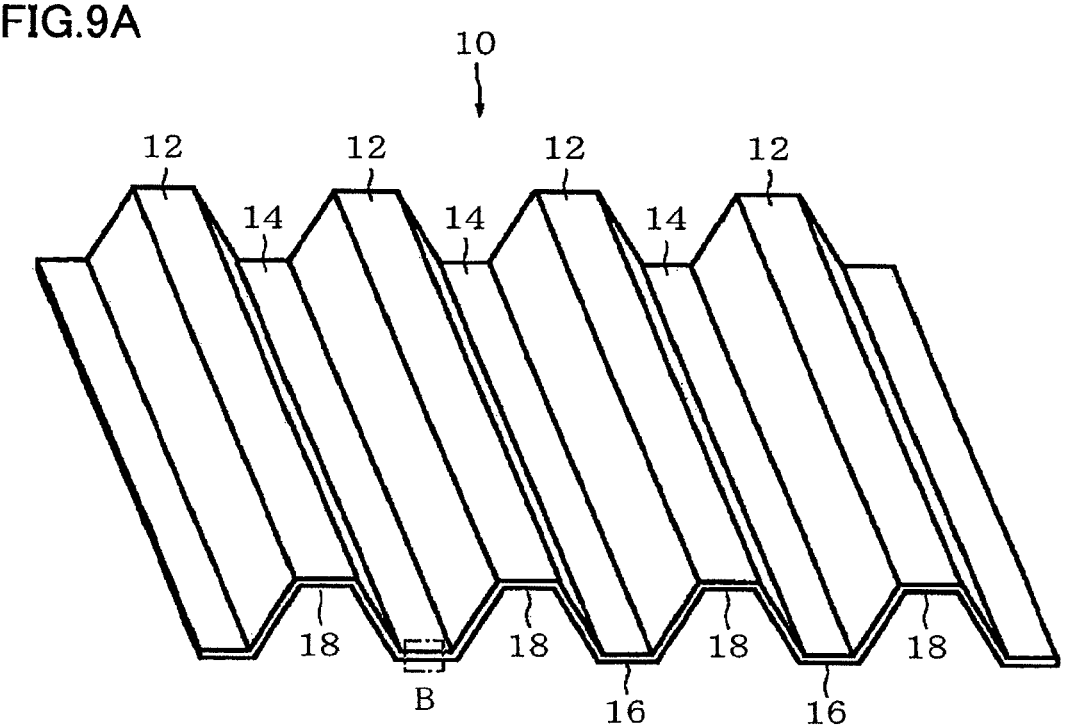
FIG. 9A is a perspective view of a separator as an exemplary mode of the cell material of a third invention.
Figure 9B:
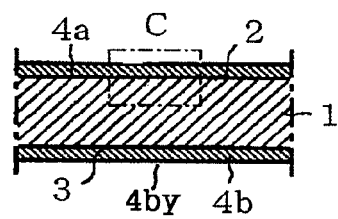
FIG. 9B is an enlarged sectional view of portion B surrounded by a dashed line in FIG. 9A.

Specific examples of the metal separator for fuel cell and a fuel cell using the same were explained previously referring to FIG. 1 and FIG. 2A to FIG. 2C, as embodiments common for those of other inventions. On the other hand, FIG. 9A shows the separator 10 which is another mode of the polymer electrolyte fuel cell material of the third invention. The separator 10 has, as shown in the drawing, a plurality of ridges 12, 16 and a plurality of grooves 14, 18 in parallel with each other on the top surface and back surface in an inside-out relation. As is shown in the enlarged view of FIG. 9B, the separator 10 comprises a plate material 1 of approximately 0.2 mm thick composed of an austenitic stainless steel, and cover films 4$a$, 4$b$ of 1 to 40 nm thick composed of Au (noble metal) formed so as to cover the top surface 2 and back surface 3 thereof. The thickness of the cover films 4$a$, 4$b$ is specified within the above-described range because the thickness smaller than 1 nm degrades the corrosion resistance, and the thickness exceeding 40 nm increases the cost. The separator 10 is exposed, for a long duration of time, to a sulfuric-acid and steamy environment of approximately 80° C. or above under power generation during which the fuel gas (hydrogen, methanol) or oxidizer gas (air, oxygen) flows through the grooves 14, 18, so as to cause the oxidation and reduction reactions through the polymer electrolyte film disposed in adjacent thereto.

Figure 9C:
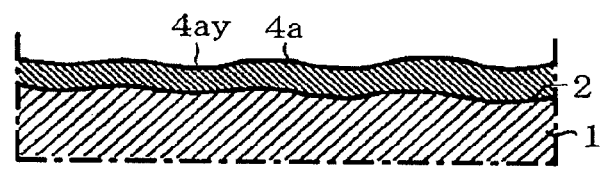
FIG. 9C is an enlarged view of portion C surrounded by a dashed line in FIG. 9B.

As shown in an enlarged sectional view of FIG. 9C, the surface 2 of the plate material 1 has a moderate regular rough, so that the cover film 4$a$ composed of Au, formed so as to cover the surface 2, also has a moderate surface 4$ay$ conforming thereto. The surface 4$ay$ of the cover film 4$a$ is compressed by rolling described later, so as to suppress the surface roughness as expressed in $R_{max}$ to as small as 1.5 μm or less. A surface 4$by$ of the cover film 4$b$ on the back surface 3 also has a similar surface roughness. Because the top surface 2 and back surface 3 are thus covered with the cover films 4$a$, 4$b$, of which surfaces 4$ay$, 4$by$ have a surface roughness expressed in $R_{max}$ of as small as 1.5 μm or less, the separator 10 can exhibit an excellent corrosion resistance in such environment for a long duration of time.

Figure 10A:
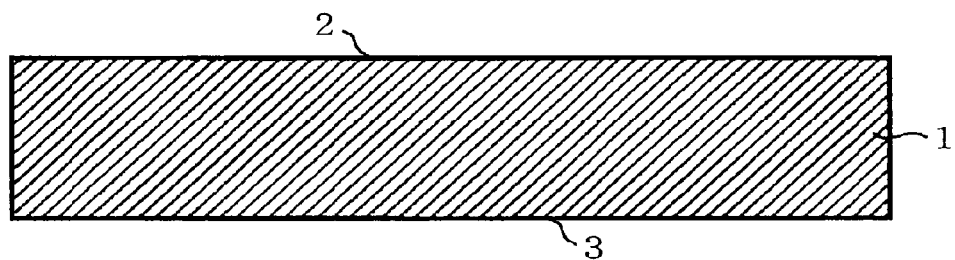
FIG. 10A is a schematic drawing showing a process step of manufacturing the cell material of the third invention.

Next paragraphs will describe a first fabrication method of the third invention for obtaining an elementary plate (polymer electrolyte fuel cell material) 8 of the separator 10, referring to FIG. 10 and FIG. 11 (combination with the first invention also allowable of course). FIG. 10A shows a section of the plate material 1 of 0.2 mm thick, composed of the austenitic stainless steel (SUS316L; C≦0.08 wt %, Si≦1.00 wt %, Mn≦2.00 wt %, P≦0.045 wt %, S≦0.030 wt %, Ni: 12.00 to 15.00 wt %, Cr: 16.00 to 18.00 wt %, Mo: 2.00 to 3.00 wt %, and the balance of Fe), which corresponds with the Fe-base alloy of the third invention.

Figure 10B:
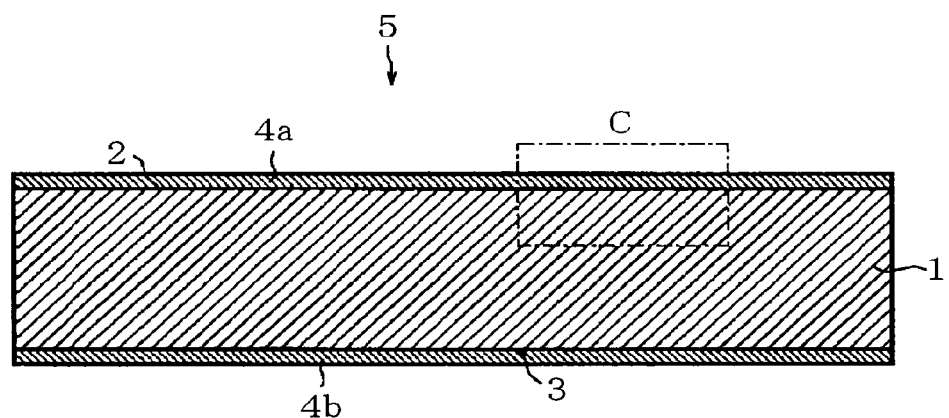
FIG. 10B is a schematic drawing showing a succeeding process step as continued from FIG. 10A.
Figure 10C:
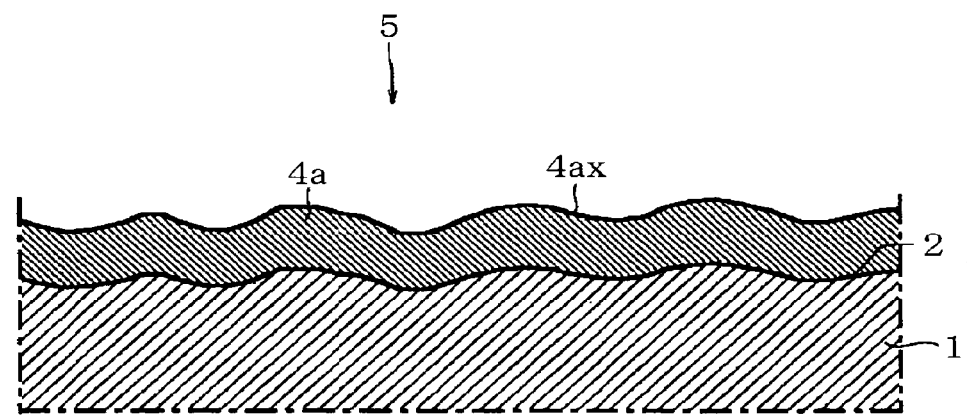
FIG. 10C is an enlarged view of portion C surrounded by a dashed line in FIG. 10B.

The top surface 2 and back surface 3 of the plate material 1 are subjected to a publicly-known Au electroplating or Au electroless plating (coverage step). This results in formation of the cover films 4a, 4b of Au (noble metal) of approximately 40 nm thick, respectively on the top surface 2 and back surface 3 of the plate material 1, to thereby obtain a stacked plate 5, as shown in FIG. 10B. As shown in an enlarged view of FIG. 10C, which is an enlargement of portion C surrounded by a dashed line in FIG. 10B, the surface 4ax of the Au film 4a has a regular rough conforming to the regular rough of the surface 2 of the plate material 1 in the stacked plate 5, with an enhanced profile. The regular rough on the surface 2 is produced due to transfer of regular roughs on the circumferential surface of the rolling roll, and loss of the metal component caused by surface treatment such as acid cleaning or by heat treatment such as annealing. The Au cover film 4a conforms to the regular rough of the surface 2 but is thicker on the projected portions and thinner on the recessed portions, so that the surface 4ax thereof finally has a more emphasized profile. It is to be noted that also the Au cover film 4b on the back surface 3 of the plate material 1 has a similar regular rough on the surface 4bx thereof.

Figure 11A:
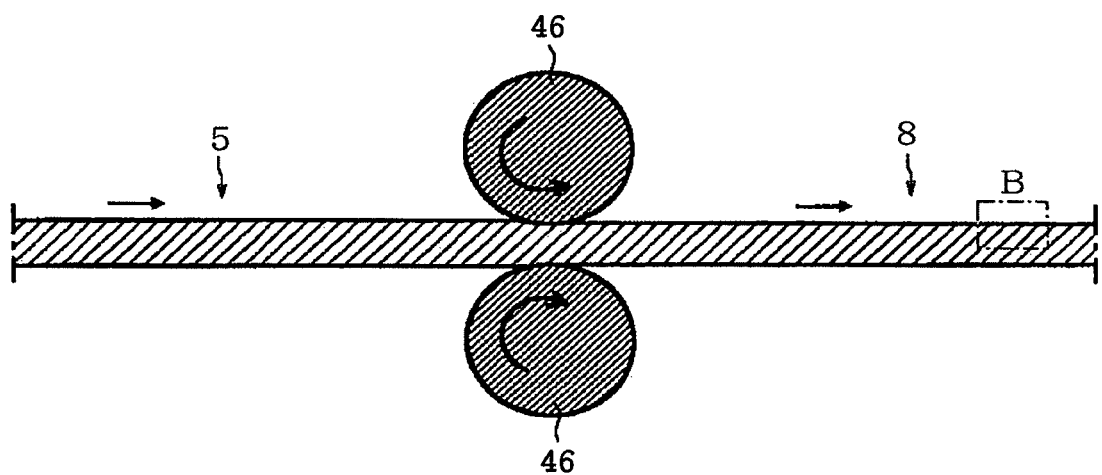
FIG. 11A is a schematic drawing showing a succeeding process step as continued from FIG. 10B.
Figure 11B:
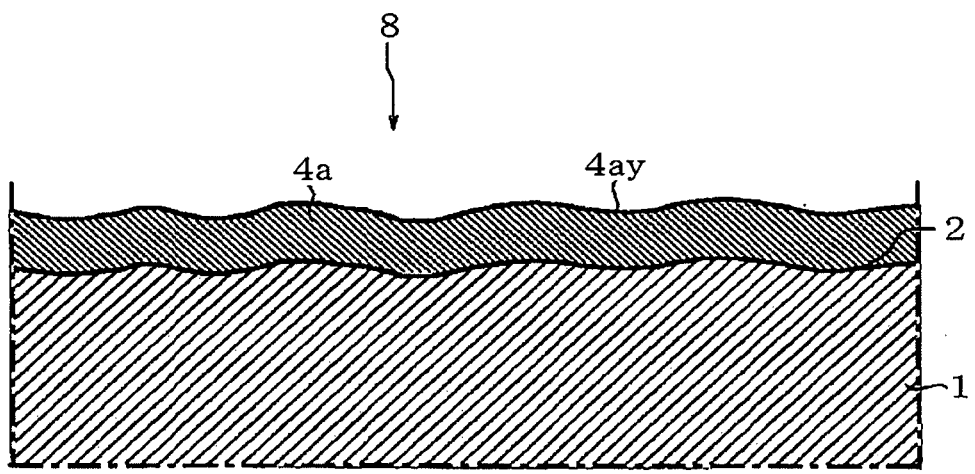
FIG. 11B is an enlarged sectional view of portion B surrounded by a dashed line in FIG. 11A.
Figure 12:
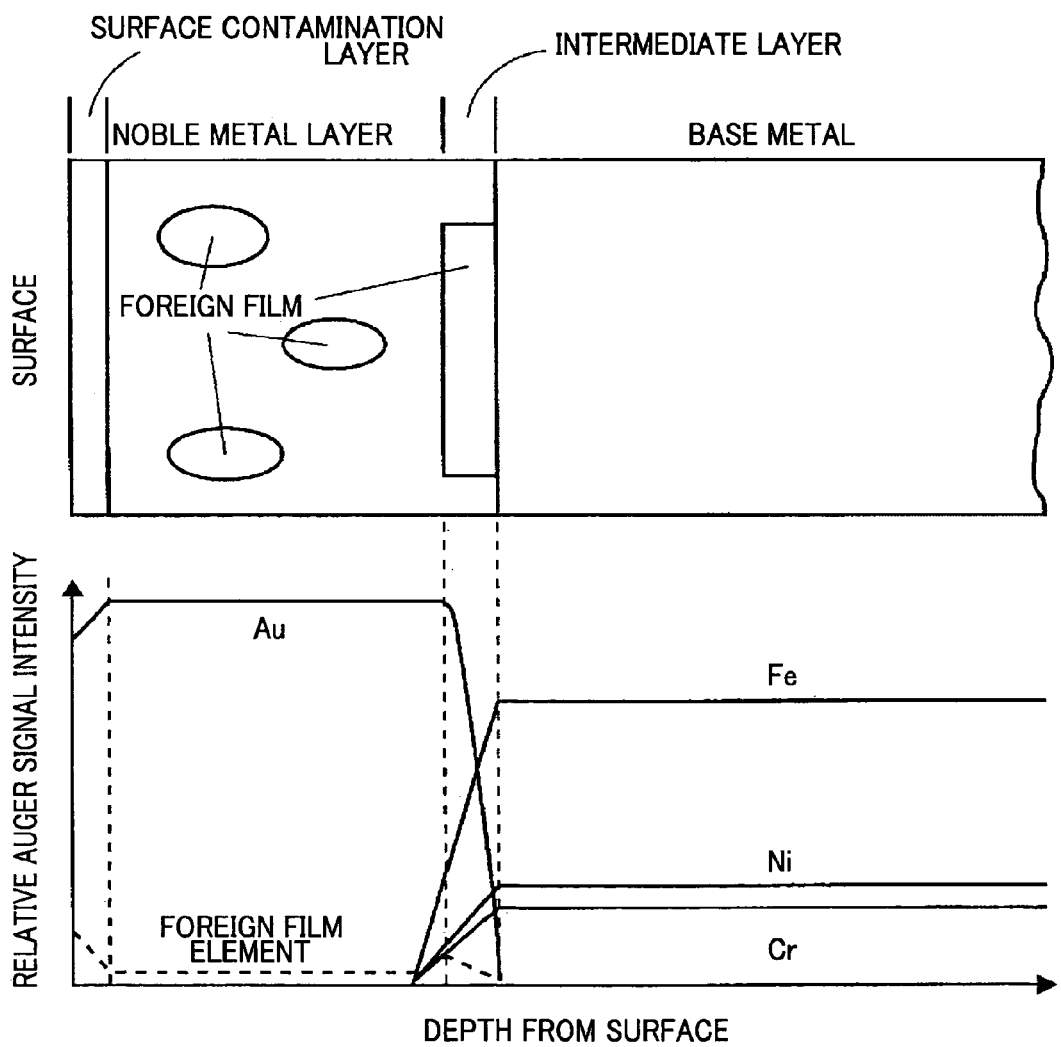
FIG. 12 is a drawing showing surface state of a corrosion-resistant conductive component comprising a metal base and a noble metal film formed thereon, wherein the upper half shows a schematic sectional view, and the lower half shows a graph of a correspondent Auger profile.

Next, the stacked plate 5 covered with the Au cover films 4a, 4b on the top and back surfaces 2, 3 thereof is subjected to cold rolling (rolling step) by allowing it to pass between a pair of rolls 6, 46 as shown in FIG. 11A. The draft herein is typically set to 1% or above, and more specifically 10%. The surface roughness of the circumferential surface of the rolls 46, 46 is 1.5 μm or less expressed in $R_{max}$. This produces the elementary plate 8 slightly thinned as shown on the right hand side of FIG. 11A. In the rolling, the Au cover films 4a, 4b, which are relatively soft, are preferentially compressed. Average thickness of the cover films 4a, 4b will be reduced nearly in proportion to the draft of the rolling. As shown in an enlarged view of FIG. 11B, which is an enlargement of portion B surrounded by a dashed line in FIG. 11A, the surface 2 of the plate material 1 is slightly compressed, so that also the regular rough thereof is smoothened to a correspondent degree. On the other hand, the surface 4ay of the Au cover film 4a newly produced by the rolling is compressed and smoothened to a considerable degree during the rolling. This is consequently successful in suppressing the surface roughness as expressed in $R_{max}$ of the surface 4ay to as small as 1.5 μm or less.

It is therefore made possible to fabricate the separator 10 excellent in the corrosion resistance as described in the above, by subjecting the elementary plate 8 to plastic working using an unillustrated press machine, to thereby form a plurality of ridges 12, 16 and a plurality of grooves 14, 18. It is also allowable to fabricate a current collector plate used for both ends of the fuel cell, by forming the Au cover film 4 on either one of the top surface 2 and back surface 3 of the plate material 1, which is followed by rolling and press forming to thereby obtain a predetermined geometry.

The plate material 1 may be composed of any stainless steels other than those described in the above, or other Fe-base alloy, Ni-base alloy, Ti and Ti alloy. The noble metal is not limited to Au, but also may be Ag, Pt, Pd, Rh or Ir, or alloys mainly composed of any of these elements. On the other hand, it is also allowable to fabricate the elementary plate 8, similarly to the second fabrication method of the third invention, by forming the cover films 4a, 4b of a noble metal such as Au on the top surface 2 and back surface 3 of the plate material 1 after the smoothening step based on electrolytic polishing or rolling using the rolls having a surface roughness as expressed in $R_{max}$ of 1.5 μm or less.

Fourth Invention

This invention relates mainly to material characters, and will be detailed later referring to experimental results. Specific examples of the metal separator for fuel cell and fuel cell using the same were explained previously referring to FIG. 1 and FIG. 2A to FIG. 2C, as embodiments common for those of other inventions.

EXAMPLES

Next paragraphs will describe results of our experiments conducted in order to confirm the effects of the individual inventions.

First Invention

Each of metal bases having any of material compositions shown in Table 1 was formed into a band form, and the Au plated film was formed thereon to a thickness up to 100 nm by the method shown in FIG. 3. The metal base having the Au plated film formed thereon was then cut by the method shown in FIG. 5A, and pressed to thereby fabricate a separator shown in FIG. 2A to FIG. 2C. The separator has a 50 mm×40 mm rectangular form. The width of the exposed surface of the metal base in the cutting plane was found to be 1 mm or less. Each thus-fabricated separator was then subjected to a corrosion test in a sulfuric acid solution. Test conditions are as follows. That is, the separator was dipped in a sulfuric acid solution of pH2 at 100° C. for 168 hours. The sulfuric acid atmosphere herein assimilates an environment in which the separator used for the fuel cell shown in FIG. 1 can be exposed during operation of the fuel cell. The sample was then taken out, and evaluated for occurrence of pinhole and crack, and the degree of corrosion and discoloration in the cutting plane (end face) portion of the separator, through observation of the outer appearance and discoloration of the sulfuric acid solution. Results are shown in Table 1. Evaluations were made while marking those showing no corrosion nor discoloration of the metal base, and no discoloration of the sulfuric acid solution with O, and those showing such corrosion and discolorations with X.

TABLE 1

|  | Tested metal base | Nickel wt % | Chromium wt % | Molybdenum wt % | Iron wt % | Copper wt % | Tantalum wt % | Titanium wt % | Aluminum wt % | Corrosion test results | Chromium + Molybdenum * 3.3 wt % |
|---|---|---|---|---|---|---|---|---|---|---|---|
| Titanium | Titanium |  |  |  |  |  |  | 100 |  | O | 0 |
| Titanium alloy | Ti—22V—4Al |  |  |  |  |  |  | 74 | 4 | O | 0 |
| Chromium | Chromium |  | 100 |  |  |  |  |  |  | O | 100 |
| Austenitic SUS | 317J5L (904L) | 25 | 20 | 7 | 48 |  |  |  |  | O | 43.1 |

TABLE 1-continued

| Tested metal base | | Nickel wt % | Chromium wt % | Molybdenum wt % | Iron wt % | Copper wt % | Tantalum wt % | Titanium wt % | Aluminum wt % | Corrosion test results | Chromium + Molybdenum * 3.3 wt % |
|---|---|---|---|---|---|---|---|---|---|---|---|
| Austenitic SUS | 317L | 14.39 | 18.65 | 3.25 | 63.71 | | | | | ○ | 29.4 |
| Austenitic SUS | 317J1 | 13 | 17 | 3 | 67 | | | | | ○ | 26.9 |
| Austenitic SUS | 310S | 19.22 | 24.7 | | 56.08 | | | | | ○ | 24.7 |
| Austenitic SUS | 316 | 12 | 17 | 2 | 69 | | | | | ○ | 23.6 |
| Nickel-base alloy | NCH1 | 78 | 21 | | | | | | | ○ | 21 |
| Nickel-base alloy | I800 | 32 | 20.5 | | 46 | 0.3 | | | | ○ | 20.5 |
| Austenitic SUS | 304 | 9 | 19 | | 72 | | | | | ○ | 19 |
| Austenitic SUS | 305 | 12 | 18 | | 70 | | | | | ○ | 18 |
| Austenitic SUS | XM7 | 9 | 18 | | 69 | 3 | | | | ○ | 18 |
| Ferritic SUS | 430 | | 17 | | 83 | | | | | ○ | 17 |
| Austenitic SUS | DSN8 | 14.24 | 16.06 | | 69.7 | | | | | ○ | 16.1 |
| Nickel-base alloy | I600 | 75.18 | 15.31 | | 9.1 | 0.6 | | | | ○ | 15.3 |
| Nickel-base alloy | M400 | 65 | | | 2 | 32 | | | | X | 0 |
| Nickel-base alloy | Nickel | 100 | | | | | | | | X | 0 |
| Carbon steel | Carbon steel | | | | 100 | | | | | X | 0 |
| | Aluminum alloy A5052 | | 0.2 | | 0.23 | 0.2 | | | >99 | X | 0.2 |

It was found from Table 1 that no corrosion or discoloration of the metal base were observed in the examples adopting Fe-base alloys and Ni-base alloys which contain at least Cr and satisfy $W_{Cr}+3.3W_{Mo} \geq 10$. Similarly no corrosion and discoloration of the metal base were observed also for the case where the metal base was composed of a simple Cr. On the other hand, corrosion and discoloration of the metal base were observed for Cr-free, Ni-base alloy (M400), aluminum alloy (A5052), simple Ni and carbon steel. It was supposed that, in the inventive examples, the passivation film was formed on the exposed surface of the metal base in the test environment, due to formation of a local cell between the metal base and Au plated film.

Next, SUS304 was adopted as a material for composing the metal base, and the Au film of 100 nm thick was formed on the surface of the band-formed metal base, according to a method similar to the above-described method. The band-formed metal base was then cut into a separator form by various methods of cutting, to thereby fabricate the separators. The width of the surface of the exposed metal base on the cutting plane of each of thus-obtained separators was observed, to thereby obtain results shown in Table 2. The separators were then subjected to the corrosion test similarly to as described in the above. The results were combined and shown in Table 2.

TABLE 2

| Width of exposed surface | Corrosion resistance |
|---|---|
| 0.05 mm | ○ |
| 0.1 mm | ○ |
| 0.2 mm | ○ |
| 0.5 mm | ○ |
| 1.0 mm | ○ |
| 2.0 mm | X |
| 5.0 mm | X |

As is known from Table 2, the separators having the width of exposed surface of the metal base exceeding 1 mm in the cutting plane thereof showed corrosion of the metal bases, but those having the width of exposed surface of the metal base of 1 mm or less showed no corrosion of the metal bases at all.

Next, three materials of SUS316L, SUS304L and SUS430 were selected as materials for composing the metal base, and the Au plated film of 100 nm thick was formed on a 50 mm×40 mm metal base of 0.2 mm thick, while varying the ratio of coverage as 5%, 10%, 20%, 50%, 70% and 90%. The corrosion test was conducted similarly to as described in the above, and the corrosion and discoloration were observed in the region where the metal base exposes. The corrosion and discoloration were observed for SUS316L having a large passivation performance ($W_{Cr}+3.3W_{Mo}$) under a ratio of coverage of 5%, but no more observed for 10% or above. On the other hand, the corrosion was no more observed for SUS304L having a smaller passivation performance under a ratio of coverage of 20% or above, and the corrosion was no more observed for SUS430 having a further smaller passivation performance under a ratio of coverage of 70% or above. In conclusion, the amount of formation of the Au plated film necessary for corrosion prevention largely depends on the passivation performance of the metal base, and an appropriate selection of a material of the metal base makes it possible to further reduce the Au consumption.

Next, SUS316L was adopted as a material for composing the metal base, and the band-formed metal bases were obtained by forming, on the entire surface thereof, the Au plated film while varying the thickness thereof to 0.5 nm, 1 nm, 3 nm, 5 nm, 10 nm, 50 nm, 100 nm, 500 nm and 1000 nm. Each of the metal bases was then shaped into separators, and the separators were then subjected to the corrosion test. It was found that the corrosion and discoloration were observed in the region where the metal base exposes under a film thickness of 0.5 nm, but no more observed under a film thickness of 1 nm or above.

Second Invention

Example 1

The second inventive examples and comparative example Steels (SUS304-base) having compositions shown in Table 3 below were melted and forged to thereby prepare ingots, and the ingots were further forged and rolled to thereby manufacture steel plates of 0.2 mm thick. The steel plates were then subjected to solution treatment at 1,100° C., and punched to produce 50×40 mm test pieces for the corrosion test. The test pieces were then subjected to the corrosion test by the procedures described below. Results are shown in Table 3. In the corrosion test, the above-described test piece was kept as being dipped in 0.4 liter (L) of a 0.1 wt % sulfuric acid solution (approximately pH2) boiled under reflux for 168 hours, and metal ions eluted into the solution was analyzed by atomic absorption spectrometry, and amount thereof was expressed in weight per 0.4 liter (L) of the solution.

eluted Ni ion of 2.2 mg/0.4 L or less, an amount of Cu ion elution of 0.6 mg/0.4 L or less, and an amount of Mo ion elution of 0.1 mg/0.4 L or less. Of these, second inventive examples No. 11 and No. 12 which are equivalent to second inventive example No. 5 but lowered in the "A" value (a value calculated by the formula of 250×[C %]+5×{Mn %}+25×[P %]+200×[S %]), and the second inventive example No. 13 which is equivalent to second inventive example No. 5 but added with Nb, showed the amount of Fe ion elution considerably lower than that of second inventive example No. 5. Effect of addition of Cu is obvious from comparison between second inventive example No. 1 and comparative example No. 1.

In contrast to this, comparative examples No. 1 and No. 3 to 5 having Cu contents lower than those of the second invention, and comparative example No. 2 having Cu content higher than that of the second invention showed all of the amount of elution of Fe ion, Cr ion and Ni ion approximately 1.5 times as large as those of the second invention. Comparative examples No. 4 and No. 5 having an "A" value of 10 or below, but having Cu content smaller than those of the second invention showed all of the amount of elution of Fe ion, Cr ion and Ni ion approximately 10 times or more as large as those of the second inventive examples.

Example 2

The second inventive examples and comparative example steels(SUSXM7-base) having compositions shown in Table 4 below were processed similarly to as described in Example 1, to thereby manufacture 50×40 mm sample steel plates for

TABLE 3

| | | Composition (wt %) | | | | | | | | | | | Amount of ion elution (mg/0.4 liter) | | | | | Judgment |
|---|---|---|---|---|---|---|---|---|---|---|---|---|---|---|---|---|---|---|
| | No. | C | Si | Mn | P | S | Cu | Ni | Cr | Mo* | N | Nb | A** | Fe | Cr | Ni | Cu | Mo | |
| Inventive | 1 | 0.072 | 0.59 | 0.76 | 0.030 | 0.009 | 0.12 | 6.27 | 17.06 | 0.08 | 0.0300 | — | 24.4 | 10 | 2.4 | 2.2 | <0.1 | <0.1 | ○ |
| Examples | 2 | 0.065 | 0.55 | 0.74 | 0.024 | 0.008 | 5.30 | 9.30 | 19.30 | 0.07 | 0.018 | — | 22.2 | 1.3 | 0.6 | 0.5 | <0.1 | <0.1 | ○ |
| | 3 | 0.056 | 0.72 | 0.96 | 0.022 | 0.002 | 0.51 | 8.67 | 18.41 | 0.46 | 0.0150 | — | 19.8 | 3.3 | 0.7 | 0.5 | <0.1 | <0.1 | ○ |
| | 4 | 0.050 | 0.77 | 0.95 | 0.024 | 0.002 | 1.05 | 8.55 | 18.38 | 0.48 | 0.0160 | — | 18.3 | 2.5 | 0.6 | 0.4 | <0.1 | <0.1 | ○ |
| | 5 | 0.068 | 0.62 | 0.76 | 0.016 | 0.006 | 2.06 | 10.27 | 18.42 | 0.29 | 0.0250 | — | 22.4 | 3.1 | 0.7 | 0.5 | <0.1 | <0.1 | ○ |
| | 6 | 0.052 | 0.56 | 0.80 | 0.026 | 0.007 | 0.13 | 10.20 | 18.12 | 0.08 | 0.0290 | 1.10 | 19.1 | 0.8 | 0.1 | 0.1 | <0.1 | <0.1 | ○ |
| | 7 | 0.066 | 0.66 | 0.74 | 0.016 | 0.006 | 4.08 | 10.24 | 18.96 | 0.28 | 0.0220 | — | 21.8 | 4.3 | 1.0 | 0.7 | 0.1 | <0.1 | ○ |
| | 8 | 0.047 | 0.58 | 0.92 | 0.020 | 0.003 | 5.98 | 12.12 | 18.52 | 0.16 | 0.0060 | — | 17.5 | 8.8 | 2.1 | 1.9 | 0.6 | <0.1 | ○ |
| | 9 | 0.010 | 0.70 | 0.86 | 0.016 | 0.008 | 0.70 | 8.96 | 18.56 | 0.50 | 0.0200 | — | 7.8 | 2.6 | 0.6 | 0.4 | <0.1 | <0.1 | ○ |
| | 10 | 0.012 | 0.68 | 0.90 | 0.020 | 0.003 | 0.62 | 8.82 | 18.44 | 0.46 | 0.0180 | 0.86 | 8.6 | 0.6 | <0.1 | <0.1 | <0.1 | <0.1 | ○ |
| | 11 | 0.016 | 0.30 | 0.32 | 0.022 | 0.004 | 2.01 | 10.30 | 18.28 | 0.30 | 0.0140 | — | 7.0 | 2.4 | 0.6 | 0.3 | <0.1 | <0.1 | ○ |
| | 12 | 0.009 | 0.17 | 0.02 | 0.005 | 0.002 | 2.08 | 10.22 | 18.32 | 0.32 | 0.0110 | — | 2.9 | 0.9 | 0.2 | 0.1 | <0.1 | <0.1 | ○ |
| | 13 | 0.065 | 0.65 | 0.74 | 0.014 | 0.005 | 2.02 | 10.32 | 18.40 | 0.32 | 0.0190 | 0.40 | 21.3 | 1.8 | 0.5 | 0.3 | <0.1 | <0.1 | ○ |
| Comparative | 1 | 0.075 | 0.55 | 0.72 | 0.029 | 0.009 | 0.05 | 6.22 | 17.11 | 0.14 | 0.0280 | — | 24.9 | 101 | 22 | 22 | <0.1 | <0.1 | X |
| Examples | 2 | 0.045 | 0.56 | 0.90 | 0.020 | 0.003 | 8.04 | 12.20 | 18.73 | 0.17 | 0.0070 | — | 16.9 | 24 | 5.9 | 1.6 | 1.2 | <0.1 | X |
| | 3 | 0.066 | 0.66 | 0.74 | 0.014 | 0.005 | 0.01 | 10.30 | 18.45 | 0.30 | 0.0220 | — | 21.6 | 168 | 42 | 28 | <0.1 | 0.7 | X |
| | 4 | 0.015 | 0.28 | 0.26 | 0.024 | 0.004 | 0.01 | 10.32 | 18.30 | 0.31 | 0.0140 | — | 6.5 | 152 | 39 | 22 | <0.1 | 0.7 | X |
| | 5 | 0.008 | 0.15 | 0.02 | 0.004 | 0.002 | 0.01 | 10.20 | 18.40 | 0.39 | 0.0110 | — | 2.6 | 146 | 38 | 21 | <0.1 | 0.6 | X |

*Mo in an amount of 0.10 wt % is judged as an impurity/
**A expresses a value calculated by a formula of 250 × [C %] + 5 × {Mn %} + 25 × [P %] + 200 × [S %].

As is known from Table 3, the second inventive examples showed an amount of Fe ion elution of 0.6 to 10 mg/0.4 L, an amount of Cr ion elution of 2.4 mg/0.4 L or less, an amount of corrosion-resistant of 0.2 mm thick. The test pieces were then subjected to the corrosion test by the procedures described in the above. Results are shown in Table 4.

TABLE 4

| | No. | C | Si | Mn | P | S | Cu | Ni | Cr | Mo* | N | Ti | A** | Fe | Cr | Ni | Cu | Mo | Judgment |
|---|---|---|---|---|---|---|---|---|---|---|---|---|---|---|---|---|---|---|---|
| Inventive Examples | 14 | 0.058 | 0.48 | 0.68 | 0.011 | 0.004 | 2.16 | 8.05 | 17.09 | 0.50 | 0.0200 | — | 19.0 | 5.4 | 1.2 | 0.6 | <0.1 | <0.1 | ○ |
| | 15 | 0.056 | 0.48 | 0.65 | 0.012 | 0.004 | 2.12 | 8.08 | 17.10 | 1.01 | 0.0210 | — | 18.4 | 4.6 | 1.1 | 0.5 | <0.1 | <0.1 | ○ |
| | 16 | 0.066 | 0.38 | 0.78 | 0.028 | 0.006 | 3.84 | 10.12 | 18.95 | 2.06 | 0.0060 | — | 22.2 | 5.2 | 1.5 | 0.8 | <0.1 | <0.1 | ○ |
| | 17 | 0.068 | 0.35 | 0.77 | 0.027 | 0.005 | 3.82 | 9.78 | 18.75 | 3.04 | 0.0050 | — | 22.7 | 6.8 | 2.0 | 1.1 | 0.2 | 0.3 | ○ |
| | 18 | 0.062 | 0.38 | 0.77 | 0.028 | 0.005 | 3.86 | 9.46 | 18.44 | 4.00 | 0.0070 | — | 21.1 | 9.9 | 2.9 | 1.6 | 0.4 | 0.6 | ○ |
| | 19 | 0.018 | 0.24 | 0.26 | 0.016 | 0.004 | 3.55 | 10.11 | 18.65 | 2.10 | 0.0130 | — | 7.0 | 1.8 | 0.5 | 0.3 | <0.1 | <0.1 | ○ |
| | 20 | 0.008 | 0.15 | 0.02 | 0.005 | 0.002 | 3.62 | 10.16 | 18.70 | 2.13 | 0.0120 | — | 2.6 | 0.6 | 0.2 | 0.1 | <0.1 | <0.1 | ○ |
| | 21 | 0.063 | 0.32 | 0.76 | 0.025 | 0.005 | 3.80 | 10.08 | 18.92 | 2.02 | 0.0130 | 0.40 | 21.2 | 3.2 | 0.9 | 0.5 | <0.1 | <0.1 | ○ |
| Comparative Examples | 6 | 0.056 | 0.47 | 0.68 | 0.016 | 0.005 | 2.12 | 8.12 | 17.16 | 0.01 | 0.0220 | — | 18.8 | 186 | 44 | 35 | 10 | <0.1 | X |
| | 7 | 0.054 | 0.49 | 0.66 | 0.014 | 0.005 | 2.14 | 8.18 | 17.08 | 0.10 | 0.0210 | — | 18.2 | 18 | 4.4 | 2.2 | 1.1 | <0.1 | X |
| | 8 | 0.066 | 0.36 | 0.74 | 0.036 | 0.006 | 3.88 | 9.12 | 18.12 | 5.03 | 0.0060 | — | 22.1 | 18 | 5.5 | 2.9 | 0.6 | 1.5 | X |
| | 9 | 0.067 | 0.36 | 0.78 | 0.030 | 0.006 | 3.64 | 10.22 | 18.78 | 0.01 | 0.0080 | — | 22.6 | 62 | 18 | 10 | 3.4 | <0.1 | X |
| | 10 | 0.017 | 0.25 | 0.24 | 0.015 | 0.004 | 3.45 | 10.06 | 18.66 | 0.01 | 0.0140 | — | 6.6 | 56 | 16 | 8.6 | 3.1 | <0.1 | X |
| | 11 | 0.007 | 0.16 | 0.02 | 0.004 | 0.002 | 3.66 | 10.14 | 18.62 | 0.01 | 0.0130 | — | 2.4 | 50 | 15 | 7.7 | 2.8 | <0.1 | X |

*Mo in an amount of 0.10 wt % is judged as an impurity/
**A expresses a value calculated by a formula of $250 \times [C\%] + 5 \times \{Mn\%\} + 25 \times [P\%] + 200 \times [S\%]$.

As is known from Table 4, the second inventive examples showed an amount of Fe ion elution of 0.6 to 9.9 mg/0.4 L, an amount of Cr ion elution of 0.2 to 2.9 mg/0.4 L, an amount of eluted Ni ion of 0.1 to 1.6 mg/0.4 L, an amount of Cu ion elution of 0.4 mg/0.4 L or less, and an amount of Mo ion elution of 0.6 mg/0.4 L or less. Of these, second inventive examples No. 19 and No. 21 which are equivalent to second inventive example No. 16 but lowered in the "A" value, and the second inventive example No. 21 which is equivalent to second inventive example No. 16 but added with Ti, showed the amount of Fe ion elution considerably lower than those of the other second inventive examples. Effect of addition of Mo is obvious from comparison between second inventive example No. 15 and comparative example No. 6.

In contrast to this, comparative examples No. 6, No. 7 and No. 9 to 11 having Mo contents lower than those of the second invention, and comparative example No. 8 having Mo content higher than that of the second invention showed all of the amount of elution of Fe ion, Cr ion and Ni ion approximately 1.5 times as large as those of the second inventive examples. Comparative examples No. 10 and No. 11 having an "A" value of 10 or below, but having Mo content smaller than those of the second invention showed all of the amount of elution of Fe ion, Cr ion and Ni ion approximately 5 times or more as large as those of the second inventive examples.

Example 3

The second inventive examples and comparative example Steels (SUS316-base) having compositions shown in Table 5 below were processed similarly to as described in Example 1, to thereby manufacture 50×40 mm sample steel plates for corrosion-resistant of 0.2 mm thick. The test pieces were then subjected to the corrosion test by the procedures described in the above. Results are shown in Table 5.

TABLE 5

| | No. | C | Si | Mn | P | S | Cu | Ni | Cr | Mo* | N | Nb | A** | Fe | Cr | Ni | Cu | Mo | Judgment |
|---|---|---|---|---|---|---|---|---|---|---|---|---|---|---|---|---|---|---|---|
| Inventive Examples | 22 | 0.065 | 0.65 | 0.74 | 0.030 | 0.009 | 0.11 | 10.56 | 16.33 | 2.22 | 0.0290 | — | 22.5 | 10 | 2.2 | 1.4 | <0.1 | 0.3 | ○ |
| | 23 | 0.022 | 0.73 | 0.97 | 0.025 | 0.006 | 0.50 | 12.22 | 17.56 | 2.12 | 0.0150 | — | 12.2 | 1.0 | 0.2 | 0.2 | <0.1 | <0.1 | ○ |
| | 24 | 0.020 | 0.72 | 0.96 | 0.024 | 0.005 | 1.00 | 12.32 | 17.54 | 2.10 | 0.0160 | — | 11.4 | 0.8 | 0.2 | 0.1 | <0.1 | <0.1 | ○ |
| | 25 | 0.055 | 0.44 | 0.68 | 0.030 | 0.007 | 2.02 | 13.66 | 18.02 | 1.32 | 0.0070 | — | 19.3 | 1.1 | 0.3 | 0.2 | <0.1 | <0.1 | ○ |
| | 26 | 0.054 | 0.46 | 0.66 | 0.028 | 0.007 | 4.03 | 13.56 | 18.00 | 1.35 | 0.0080 | — | 18.9 | 2.0 | 0.6 | 0.4 | <0.1 | <0.1 | ○ |
| | 27 | 0.068 | 0.72 | 0.47 | 0.016 | 0.005 | 6.00 | 14.32 | 18.41 | 3.58 | 0.0210 | — | 21.0 | 5.0 | 1.5 | 1.2 | 0.5 | 0.3 | ○ |
| | 28 | 0.020 | 0.26 | 0.27 | 0.023 | 0.002 | 2.03 | 13.86 | 18.10 | 1.59 | 0.0110 | — | 7.3 | 0.6 | 0.2 | 0.1 | <0.1 | <0.1 | ○ |
| | 29 | 0.009 | 0.15 | 0.02 | 0.006 | 0.002 | 2.08 | 13.46 | 18.09 | 1.48 | 0.0120 | — | 2.9 | 0.2 | 0.3 | 0.2 | <0.1 | <0.1 | ○ |
| | 30 | 0.052 | 0.48 | 0.60 | 0.028 | 0.007 | 2.10 | 13.57 | 18.16 | 1.40 | 0.0140 | 1.10 | 18.1 | 0.8 | 0.2 | 0.2 | <0.1 | <0.1 | ○ |
| Comparative Examples | 12 | 0.068 | 0.67 | 0.72 | 0.028 | 0.009 | 0.05 | 10.52 | 16.23 | 2.23 | 0.0280 | — | 23.1 | 162 | 36 | 23 | <0.1 | 4.5 | X |
| | 13 | 0.053 | 0.48 | 0.72 | 0.030 | 0.006 | 0.01 | 13.56 | 18.00 | 1.38 | 0.0070 | — | 18.8 | 121 | 33 | 26 | <0.1 | 2.3 | X |
| | 14 | 0.018 | 0.28 | 0.24 | 0.020 | 0.003 | 0.01 | 13.72 | 18.11 | 1.47 | 0.0110 | — | 6.8 | 110 | 30 | 23 | <0.1 | 2.5 | X |
| | 15 | 0.006 | 0.16 | 0.03 | 0.007 | 0.001 | 0.01 | 13.68 | 18.08 | 1.50 | 0.0120 | — | 2.0 | 102 | 28 | 22 | <0.1 | 2.3 | X |

*Mo in an amount of 0.10 wt % is judged as an impurity/
**A expresses a value calculated by a formula of $250 \times [C\%] + 5 \times \{Mn\%\} + 25 \times [P\%] + 200 \times [S\%]$.

As is known from Table 5, the second inventive examples showed an amount of Fe ion elution of 0.2 to 10 mg/0.4 L, an amount of Cr ion elution of 0.2 to 2.2 mg/0.4 L, and an amount of eluted Ni ion of 0.1 to 1.4 mg/0.4 L. Of these, second inventive examples No. 28 and No. 29 which are equivalent to second inventive example No. 25 but lowered in the "A" value, and the second inventive example No. 31 which is equivalent to second inventive example No. 25 but added with Nb, showed the amount of such as Fe ion elution considerably lower than those of the other second inventive example No. 25. Effect of addition of Cu is obvious from comparison between second inventive example No. 22 and comparative example No. 12.

In contrast to this, comparative examples No. 12 to No. 11 having Cu contents lower than those of the second invention showed all of the amount of elution of Fe ion, Cr ion and Ni ion 10 times as large as those of the second inventive examples. Comparative examples No. 14 and No. 15 having "A" values of 10 or below, but having Cu content smaller than those of the second invention showed all of the amount of elution of Fe ion, Cr ion and Ni ion smaller than those for the examples having "A" value exceeding 10, but approximately 10 times or more as large as those of the second inventive examples.

Third Invention

Next paragraphs will describe specific examples of the third invention together with comparative examples.

Eight plate materials 1 composed of the above-described austenitic stainless steel (SUS316L: Fe-base alloy) of 40 mm wide, 50 mm long and 0.2 mm thick were obtained. Surface roughness ($R_{max}$) of the top surface 2 and back surface 3 were measured, and the results were listed in Table 6.

Of these, two plate materials (inventive examples 5, 6) 1 were preliminarily smoothened on the top surfaces 2 and back surfaces 3 by electrolytic polishing, and the surface roughness was measured.

The Au films 4a, 4b were then formed on the top surfaces 2 and back surfaces 3 of eight plate materials 1 to a thickness of 20 nm under the same plating conditions, to thereby obtain eight stacked plates 5.

Next, six stacked plates 5, excluding one of two smoothened plate materials (inventive example 6) and comparative example 2, were subjected to a single pass of cold rolling under a draft of 10%, to thereby obtain the elementary plates 8. Surface roughness after the rolling was measured, and the results were shown in Table 6.

Of six plate materials not being subjected to the smoothening process, the five subjected to rolling were named Examples 1 to 4 and Comparative Example 1. The one subjected to both of the smoothening and rolling processes was named Example 5, and the one subjected to the smoothening process but not to the rolling process was named Example 6. In addition, the residual one subjected to neither of the smoothening process nor the rolling process was named Comparative Example 2.

The above-described individual elementary plates 8 and stacked plates 5 were subjected to the corrosion test.

In the corrosion test, each of the plates of the individual examples was kept as being dipped in 0.4 liter (L) of a 0.1% sulfuric acid solution (pH2) boiled under reflux for 168 hours (7 days), and metal ions eluted into the solution was analyzed by atomic absorption spectrometry, and amount thereof was expressed in weight per 0.4 liter (L) of the solution. Also these results were listed by the individual examples in Table 6.

TABLE 6

| | Surface roughness before plating ($R_{max}$ μm) | Surface roughness after rolling ($R_{max}$ μm) | Amount of Fe ion elution (mg/L) | Amount of Ni ion elution (mg/L) |
|---|---|---|---|---|
| Example 1 | 2.2 | 0.2 | 0.02 | 0 |
| Example 2 | 2.2 | 0.8 | 0.02 | 0 |
| Example 3 | 2.2 | 1.2 | 0.07 | 0.01 |
| Example 4 | 2.2 | 1.5 | 0.15 | 0.01 |
| Example 5 | 1.2 | 0.2 | 0.01 | 0 |
| Example 6 | 0.8 | 0.8 (not rolled) | 0.05 | 0 |
| Comparative example 1 | 2.2 | 1.8 | 0.19 | 0.02 |
| Comparative example 2 | 2.2 | 2.2 (not rolled) | 2.7 | 0.02 |

As is known from Table 6, Examples 1 to 6 show amount of Fe ion elution of 0.15 mg/liter or less, and amount of Ni ion elution of 0.01 mg/liter or less, which are within the specified ranges. The plate materials of the Examples can therefore exhibit an excellent corrosion resistance in a reliable manner even when they are exposed, as the separator 10 or current collector plate composed of the above-described cell material, to an extremely corrosive environment for a long duration of time.

In contrast to this, Comparative Example 1 showed both of amounts of Fe ion elution and Ni ion elution slightly exceeding the specified ranges due to a surface roughness ($R_{max}$) after rolling of as large as 1.8 μm, despite a surface roughness ($R_{max}$) before Au plating of 2.2 μm.

Comparative Example 2 which was subjected only to the Au plating but not to rolling or smoothing was found to be extremely increased both in the amounts of Fe ion elution and Ni ion elution.

Example 5 which was preliminarily subjected to the smoothening step prior to the Au plating was found to have a surface roughness ($R_{max}$) after Au plating of as small as 1.2 μm, and to have a surface roughness ($R_{max}$) after rolling of again as small as 0.2 μm, and was smallest of all examples in the amounts of Fe ion elution and Ni ion elution. Example 6 which was preliminarily smoothened by electrolytic polishing so as to reduce the surface roughness ($R_{max}$) to as small as 0.8 μm, was found to fall in the above-described specified ranges even without the rolling.

It will readily be understood that the results of Examples 1 to 6 proved the effect of the third invention.

According to the polymer electrolyte fuel cell material of the third invention, a planarized regular rough is formed on the surface of the cover film of noble metal conforming to the micro-irregularity on the surface of the plate material, and the cover film of noble metal is smoothened as being expressed by a surface roughness ($R_{max}$) of as small as 1.5 μm or less, so that the natural potential is averaged over the entire surface. This makes it possible for the cell material to exhibit an excellent corrosion resistance even if it is exposed to a corrosive environment for a long duration of time.

The above-described cell material is also successful in exhibiting an excellent corrosion resistance in a more reliable manner, if it is exposed for a long time, in a form of a separator for example, to an extremely corrosive environment.

According to the first method of manufacturing a polymer electrolyte fuel cell material of the third invention, it is made possible to fabricate the cell material covered with the cover film of a noble metal and having a smooth surface in a reliable-and-efficient manner.

According to the method of manufacturing the cell material, it is made possible to surely smoothen the cover film of a noble metal, which is formed conforming to the micro-irregularity on the surface of the plate material, so as to reduce the surface roughness as expressed in $R_{max}$ to as small as 1.5 μm or less.

According to the second method of manufacturing a polymer electrolyte fuel cell material of the third invention, the surface of the plate material is preliminarily planarized, so that the coverage by the noble metal layer will be done in a smoothened manner.

Fourth Invention

Cleaning for removing foreign films was carried out by the wet process or dry process. First, representative process steps of the wet process are as follows:

1) degreasing: a material-to-be-processed is dipped in a solution, which contains 40 g/L of sodium orthosilicate and 1 g/L of a surfactant dissolved therein and is kept at 60° C., for approximately one minute;

2) cleaning and drying: the material-to-be-processed is subjected to ultrasonic cleaning in pure water, and is allowed to stand in a dry air, or is blown with a dry nitrogen gas or the like;

3) removal of contamination film: a 10% sulfuric acid solution is kept at 60° C., and electrolysis is carried out therein while keeping the material-to-be-processed as an anode, under a current density of approximately 5 A/dm² for approximately one minute;

4) cleaning and drying: same as those described in the above;

5) activation: a 10% sulfuric acid solution is kept at 60° C., and the material-to-be-processed is dipped therein for approximately one minute;

6) cleaning and drying: same as those described in the above;

7) noble metal plating: electroplating is carried out in a plating bath containing a noble metal salt dissolved therein; and 8) cleaning and drying: same as those described in the above.

Representative process steps of the dry process are as follows:

1) degreasing: a material-to-be-processed is dipped in a solution, which contains 40 g/L of sodium orthosilicate and 1 g/L of a surfactant dissolved therein and is kept at 60° C., for approximately one minute;

2) cleaning and drying: the material-to-be-processed is subjected to ultrasonic cleaning in pure water, and is allowed to stand in a dry air, or is blown with a dry nitrogen gas or the like;

3) evacuation: up to $1 \times 10^{-6}$ Torr;

4) removal of contamination film: after the evacuation, argon gas at 5 mTorr is introduced, ionized under a beam current of 250 mA, and is then irradiated onto the surface of the material-to-be-processed for approximately 5 minutes; and 5) formation of noble metal film: sputtering or vacuum evaporation in argon gas.

Some of the cleaning carried out in the Examples below may slightly be modified, so that possible processes will be listed below:

A: same as the representative wet process described in the above;

B: in process step 3) "removal of contamination film" in method "A" in the above, the material-to-be-processed is dipped in a 5% sulfuric acid solution kept at room temperature for approximately 30 seconds;

C: in process step 3) "removal of contamination film" in method "A" in the above, the material-to-be-processed is dipped in a 10% hydrochloric acid solution kept at room temperature for approximately 30 seconds;

D: same as the representative dry process described in the above; and

E: in process step 4) "removal of contamination film" in method "D" in the above, after the evacuation, argon gas at 3 mTorr is introduced, ionized under a beam current of 100 mA, and is then irradiated onto the surface of the material-to-be-processed for approximately 3 minutes.

Various austenitic stainless steels (austenitic ones for all) were used as the metal base, cleaning was carried out according to any one of methods "A" to "E" listed in the above, and after elapse of a predetermined interval of time, a film of Au, Pt, Pd, Rh or Ru was formed thereon by electroplating or sputtering. Species of the metal base, cleaning methods, time interval, film forming methods and film thickness are listed in Table 7.

The obtained corrosion-resistant conductive materials were subjected to Auger analysis, to thereby measure contents of C, P, O and S, which are impurities in the noble metal film and intermediate layer, and to thereby find Cr/Fe ratio and Ni/Fe ratio of the intermediate layer. The dipping test was then carried out in a boiling sulfuric acid of pH 2 for 168 hours. Amount of Fe, Ni and Cr ions eluted into 400 ml of the sulfuric acid solution were measured, wherein those showing an amount of Fe elution exceeding 0.2 mg, or those having a total amount of Fe+Ni+Cr elution exceeding 0.3 mg were judged as unacceptable. Results were shown in Table 8.

TABLE 7

| Classification No. | Metal base SUS | Cleaning method | Noble metal | Coverage method | Film thickness (nm) | Interval (min) |
| --- | --- | --- | --- | --- | --- | --- |
| Example 1 | 316L | A | Au | electroplating | 40 | 0.2 |
| Example 2 | 316L | A | Au | electroplating | 40 | 0.8 |
| Example 3 | 316L | A | Au | electroplating | 10 | 0.4 |
| Example 4 | 316L | A | Au | electroplating | 80 | 0.4 |
| Comparative Example 1 | 316L | A | Au | electroplating | 40 | 1.5 |
| Comparative Example 2 | 316L | B | Au | electroplating | 40 | 0.4 |
| Comparative Example 3 | 316L | C | Au | electroplating | 40 | 0.4 |
| Example 5 | 304 | A | Au | electroplating | 60 | 0.5 |
| Example 6 | 304L | A | Au | electroplating | 60 | 0.5 |
| Example 7 | 316 | A | Au | electroplating | 60 | 0.5 |
| Example 8 | XM7 | A | Au | electroplating | 60 | 0.5 |
| Example 9 | 316J1L | A | Au | electroplating | 10 | 0.5 |
| Example 10 | 317J1 | A | Au | electroplating | 20 | 0.5 |
| Example 11 | 431 | A | Au | electroplating | 80 | 0.2 |
| Example 12 | 316L | D | Au | sputtering | 40 | 0.1 |
| Comparative Example 4 | 316L | D | Au | sputtering | 40 | 3.0 |

TABLE 7-continued

| Classification No. | Metal base SUS | Cleaning method | Noble metal | Coverage method | Film thickness (nm) | Interval (min) |
|---|---|---|---|---|---|---|
| Comparative Example 5 | 316L | E | Au | sputtering | 40 | 0.2 |
| Example 13 | 301 | D | Pt | sputtering | 40 | 0.1 |
| Example 14 | 310S | D | Pd | sputtering | 40 | 0.1 |
| Example 15 | 347 | D | Rh | sputtering | 40 | 0.1 |
| Example 16 | 316L | D | Ru | sputtering | 40 | 0.1 |

TABLE 8

| | Noble metal film layer and intermediate layer | | | | | | | | | | |
|---|---|---|---|---|---|---|---|---|---|---|---|
| | Maximum impurity concentration | | | | | Maximum concentration ratio | | Amount of ion elution | | | |
| Classification No. | C (%) | P (%) | O (%) | S (%) | Total (%) | Cr/Fe | Ni/Fe | Fe (mg) | Ni (mg) | Cr (mg) | Total (mg) | Judgment |
| Example 1 | 1.0 | 0.9 | 0.0 | 0.0 | 1.9 | 0.7 | 0.9 | 0.04 | 0.01 | 0.01 | 0.06 | ○ |
| Example 2 | 1.0 | 1.0 | 0.0 | 0.0 | 2.0 | 0.5 | 0.8 | 0.03 | 0.01 | 0.01 | 0.05 | ○ |
| Example 3 | 1.2 | 1.2 | 0.2 | 0.3 | 0.9 | 2.9 | 0.8 | 0.15 | 0.03 | 0.02 | 0.20 | ○ |
| Example 4 | 1.0 | 1.1 | 0.0 | 0.0 | 2.1 | 0.8 | 0.8 | 0.04 | 0.01 | 0.01 | 0.06 | ○ |
| Comparative Example 1 | 2.8 | 1.2 | 1.6 | 0.3 | 5.9 | 0.7 | 0.9 | 0.28 | 0.03 | 0.02 | 0.33 | X |
| Comparative Example 2 | 4.0 | 3.0 | 0.7 | 1.6 | 9.3 | 2.8 | 1.4 | 0.34 | 0.09 | 0.10 | 0.53 | X |
| Comparative Example 3 | 1.1 | 1.1 | 0.4 | 0.9 | 3.5 | 3.1 | 2.2 | 0.22 | 0.06 | 0.06 | 0.34 | X |
| Example 5 | 1.4 | 1.0 | 0.0 | 0.0 | 2.4 | 1.2 | 0.8 | 0.16 | 0.01 | 0.01 | 0.18 | ○ |
| Example 6 | 1.0 | 1.0 | 0.0 | 0.0 | 2.0 | 0.9 | 0.9 | 0.05 | 0.01 | 0.01 | 0.07 | ○ |
| Example 7 | 1.3 | 0.9 | 0.0 | 0.0 | 2.2 | 0.7 | 0.7 | 0.15 | 0.01 | 0.01 | 0.17 | ○ |
| Example 8 | 1.0 | 1.1 | 0.0 | 0.0 | 2.1 | 0.6 | 0.6 | 0.05 | 0.01 | 0.01 | 0.07 | ○ |
| Example 9 | 1.1 | 1.3 | 0.2 | 0.4 | 3.0 | 0.6 | 0.7 | 0.07 | 0.02 | 0.03 | 0.12 | ○ |
| Example 10 | 1.2 | 1.1 | 0.1 | 0.2 | 2.6 | 0.7 | 0.6 | 0.04 | 0.01 | 0.01 | 0.06 | ○ |
| Example 11 | 1.1 | 0.8 | 0.2 | 0.1 | 2.2 | 0.7 | 0.0 | 0.11 | 0.00 | 0.05 | 0.16 | ○ |
| Example 12 | 1.0 | 0.9 | 0.0 | 0.0 | 1.9 | 1.0 | 0.9 | 0.05 | 0.01 | 0.01 | 0.07 | ○ |
| Comparative Example 4 | 8.0 | 6.0 | 3.0 | 2.0 | 19 | 2.8 | 1.4 | 0.50 | 0.12 | 0.13 | 0.75 | X |
| Comparative Example 5 | 2.5 | 2.2 | 1.0 | 0.5 | 6.2 | 2.5 | 1.2 | 0.36 | 0.09 | 0.10 | 0.55 | X |
| Example 13 | 1.1 | 0.9 | 0.0 | 0.0 | 2.0 | 1.0 | 0.9 | 0.08 | 0.02 | 0.02 | 0.12 | ○ |
| Example 14 | 1.0 | 1.0 | 0.0 | 0.0 | 2.0 | 1.0 | 0.9 | 0.09 | 0.02 | 0.01 | 0.12 | ○ |
| Example 15 | 1.2 | 0.9 | 0.0 | 0.0 | 2.1 | 1.0 | 0.9 | 0.09 | 0.02 | 0.01 | 0.12 | ○ |
| Example 16 | 1.0 | 1.1 | 0.0 | 0.0 | 2.1 | 1.0 | 0.9 | 0.07 | 0.01 | 0.02 | 0.10 | ○ |

The present inventors revealed for the case where a thin film of noble metal such as gold is formed on a metal base such as stainless steel, that properties of the thin film, in particular presence/absence and amount of pinholes and adhesiveness thereof to the base, distinctively vary depending on foreign matters which reside in the thin film, in particular contents of C, P, O and S as impurities, and also depending on composition of the intermediate layer which resides between the base and the thin film. The present inventors also confirmed that this sort of influence becomes particularly large for the case where the noble metal film is as extremely thin as 100 nm or less.

Based on the discovery, proposed is the fourth invention which is characterized in that it prevents re-contamination of the purified surface of the base by carrying out the cleaning operation for removing foreign film contaminating the surface of the base and the succeeding thin film forming operation within a short interval of time, and thereby succeeded in forming the noble metal thin film which is extremely less in the impurities, has almost no pinholes, has denseness, and shows a desirable adhesiveness to the base.

The fourth invention can therefore provide a corrosion-resistant conductive material, represented by a metal separator used in polymer electrolyte fuel cells, which is excellent in the corrosion resistance, high in the electric conductivity and low in the contact resistance. The metal separator shows a satisfactory electric conductivity and an excellent corrosion resistance in a high-temperature condition of use, despite it only has, as being formed on the surface thereof, a noble metal thin film of as thin as several ten nanometers. The cost thereof is in a level allowing an easy industrialization, by virtue of a small consumption of the noble metal.

The invention claimed is:

1. A metal component for a fuel cell configured using austenitic stainless steel for a polymer electrolyte fuel cell, consisting essentially of, in % by weight, Cu: 0.10-6.00%, Ni: 6.00-13.00%, Cr: 16.00-20.00% and N: 0.005-0.30%, and also of C: less than 0.02%, Si: 1.00% or less, Mn: 1.00% or less, P: 0.030% or less and S: 0.005% or less, satisfying a relation of $250\times[C\%]+5\times[Mn\%]+25\times[P\%]+200\times[S\%]<10$, and the balance of Fe and inevitable impurities, wherein said metal component is disposed in contact with a main cell unit comprising a polymer electrolyte film as an electrolyte held between a pair of electrodes, wherein said electrode has a plate form and is in contact with said polymer electrolyte film on a first main surface thereof, and said metal component is a plate-formed metal base disposed in contact with said electrode on a second main surface thereof, having a regular rough on the main surface opposing to said electrode, projected portions of said regular rough being brought into contact with said electrode, and recessed portions of said regular rough serving as a gas flow path through which a fuel gas or an oxidizer gas is supplied to said electrode.

2. A metal component for a fuel cell configured using austenitic stainless steel for a polymer electrolyte fuel cell, consisting essentially of, in % by weight, Cu: 0.10-6.00%, Ni: 6.00-13.00%, Cr: 16.00-20.00%, Mo: 0.10-4.00% and N: 0.005-0.30%, and also of C: less than 0.02%, Si: 1.00% or less, Mn: 1.00% or less, P: 0.030% or less and S: 0.005% or less, satisfying a relation of $250\times[C\ \%]+5\times[Mn\ \%]+25\times[P\ \%]+200\times[S\ \%]<10$, and the balance of Fe and inevitable impurities, wherein said metal component is disposed in contact with a main cell unit comprising a polymer electrolyte film as an electrolyte held between a pair of electrodes, wherein said electrode has a plate form and is in contact with said polymer electrolyte film on a first main surface thereof, and said metal component is a plate-formed metal base disposed in contact with said electrode on a second main surface thereof, having a regular rough on the main surface opposing to said electrode, projected portions of said regular rough being brought into contact with said electrode, and recessed portions of said regular rough serving as a gas flow path through which a fuel gas or an oxidizer gas is supplied to said electrode.

3. A metal component for a fuel cell configured using austenitic stainless steel for a polymer electrolyte fuel cell, consisting essentially of, in % by weight, Cu: 0.10-6.00%, Ni: 10.00-15.00%, Cr: 16.00-18.50%, Mo: 1.00-4.00% and N: 0.005-0.30%, and also of C: less than 0.02%, Si: 1.00% or less, Mn: 1.00% or less, P: 0.030% or less and S: 0.005% or less, satisfying a relation of $250\times[C\ \%]+5\times[Mn\ \%]+25\times[P\ \%]+200\times[S\ \%]<10$, and the balance of Fe and inevitable impurities, wherein said metal component is disposed in contact with a main cell unit comprising a polymer electrolyte film as an electrolyte held between a pair of electrodes, wherein said electrode has a plate form and is in contact with said polymer electrolyte film on a first main surface thereof, and said metal component is a plate-formed metal base disposed in contact with said electrode on a second main surface thereof, having a regular rough on the main surface opposing to said electrode, projected portions of said regular rough being brought into contact with said electrode, and recessed portions of said regular rough serving as a gas flow path through which a fuel gas or an oxidizer gas is supplied to said electrode.

4. The metal component for a fuel cell having the austenitic stainless steel for a polymer electrolyte fuel cell as claimed in any one of claims 1-3, containing, in place of a part of Fe in the austenitic stainless steel for polymer electrolyte fuel cell, either one or both of Ti and Nb, respectively, in an amount of 1.20% or less and 5×[C %] or more.

5. A fuel cell having a main cell unit which comprises a polymer electrolyte film as an electrolyte held between a pair of electrodes and the metal component for fuel cell as claimed in any one of claims 1-3.

6. A metal component for a fuel cell available as a separator disposed in contact with a second main surface of a plate-formed electrode which is disposed in contact with a polymer electrolyte film as an electrolyte on a first main surface thereof, having a regular rough on the main surface, opposing to said electrode, of a plate-formed and Au film preformed metal base composed of a metal less noble than Au, top portions of projected portions of said regular rough being brought into contact with said electrode, and recessed portions of said regular rough serving as a gas flow path through which a fuel gas or an oxidizer gas is supplied to said electrode, wherein said metal base has an Au film of 1 to 100 nm thick formed on both of the tip surface of said projected portions brought into contact with said electrode, and the main surface region other than said tip surface, wherein said metal base is composed of a material capable of producing at least an active potential range and a passive potential range in an anode polarization curve measured in a sulfuric acid solution of pH1 at 80° C., and showing an anode current density of 100 μA/cm² or less in the passive potential region.

7. The metal component for a fuel cell as claimed in claim 6, wherein said Au film has exposed regions of said base formed therein in a discrete manner.

8. The metal component for a fuel cell as claimed in claim 6, wherein said metal base contains at least Cr.

9. The metal component for a fuel cell as claimed in claim 8, wherein said metal base is composed of an Fe-base alloy or an Ni-base alloy satisfying $W_{Cr}+3.3W_{Mo} \geq 10$, where $W_{Cr}$ (% by weight) is content of Cr contained therein, and $W_{Mo}$ (% by weight) is content of Mo.

10. The metal component for a fuel cell as claimed in any one of claims 6-9, being arranged in a sulfuric acid environment of pH 1 to 6 in the fuel cell.

* * * * *